United States Patent
Lamas Linares

(10) Patent No.: US 12,489,612 B2
(45) Date of Patent: Dec. 2, 2025

(54) METERED DISTRIBUTION OF QUANTUM ENTANGLEMENT

(71) Applicant: Amazon Technologies, Inc., Seattle, WA (US)

(72) Inventor: Antia Lamas Linares, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 18/194,278

(22) Filed: Mar. 31, 2023

(65) Prior Publication Data

US 2025/0038967 A1  Jan. 30, 2025

(51) Int. Cl.
H04L 9/08 (2006.01)

(52) U.S. Cl.
CPC .......... H04L 9/0852 (2013.01); H04L 9/0819 (2013.01)

(58) Field of Classification Search
None
See application file for complete search history.

(56) References Cited

U.S. PATENT DOCUMENTS

| | | | |
|---|---|---|---|
| 7,284,024 B1 | 10/2007 | Trifonov | |
| 9,710,231 B2 | 7/2017 | Youn | |
| 2015/0055961 A1* | 2/2015 | Meyers | H04B 10/70 398/140 |
| 2019/0042264 A1* | 2/2019 | Zou | G06F 9/30 |
| 2020/0364600 A1* | 11/2020 | Elsherbini | H01L 25/18 |
| 2021/0049494 A1* | 2/2021 | King | G06N 10/60 |
| 2021/0105135 A1* | 4/2021 | Figueroa | H04B 10/70 |
| 2022/0116208 A1* | 4/2022 | Stapleton | H04L 9/0631 |
| 2022/0309375 A1* | 9/2022 | Vacon | G06F 12/0895 |
| 2023/0020193 A1* | 1/2023 | Williams | H04L 9/0825 |
| 2023/0244459 A1* | 8/2023 | Zou | G06F 8/447 717/140 |
| 2023/0376277 A1 | 11/2023 | Venkatachalam | |

OTHER PUBLICATIONS

K. Boone, et al., "Entanglement over global distances via quantum repeaters with satellite links," arXiv preprint: arXiv:1410.5384v1 [quant-ph] 2014, pp. 1-8.

(Continued)

*Primary Examiner* — William J. Goodchild
(74) *Attorney, Agent, or Firm* — Alexander A. Knapp; Kowert, Hood, Munyon, Rankin & Goetzel, P.C.

(57) ABSTRACT

A system and method for providing metered quantum entanglement-as-a-service are described. Entangled pair source nodes apply a unitary transformation to generated entangled quantum particles, such that the entangled quantum particles are transformed into a given one of a plurality of transformed states that are selected randomly or in a manner that is not readily apparent to customers. The transformed entangled quantum particles are distributed to recipients, such as customers. However, in order for the recipients to be able to use the received entangled particles to communicate shared information, such as a shared secret, the recipients require knowledge of the respective states of the entangled quantum particles resulting from the randomly selected transformations. The state information is metered out in response to receiving payment or other authorization indicating a recipient/customer has complied with terms of use of the quantum entanglement distribution service.

20 Claims, 17 Drawing Sheets

(56) References Cited

OTHER PUBLICATIONS

Jasminder S. Sidhu, et al., "Advances in Space Quantum Communications," IET Research Journals, @ The Institution of Engineering and Technology 2015, pp. 1-26.
Sheng-Kai Liao, et al. "Satellite-relayed intercontinental quantum network," Physical Review Letters 120, 030501 (2018), pp. 1-4.
Mustafa Gündoğan, et al., "Proposal for space-borne quantum memories for global quantum networking," www.nature.com/npjqi, npj Quantum Information vol. 7, Article No. 128 (2021), pp. 1-10.
M. K. Bhaskar, et al., "Experimental demonstration of memory-enhanced quantum communication," Nature | vol. 580 | 2020, pp. 60-76.
Boone et al, "Entanglement over global distances via quantum repeaters with satellite links", Physical Review A 91 (2015), arXiv:1410.5384 [quant-ph], pp. 1-8.
Sidhu et al, "Advances in Space Quantum Communications", IET Research Journals, arXiv:2103.12749 (2021), pp. 1-26.
Gundogan et al, "Proposal for space-borne quantum memories for global quantum networking," NPJ Quantum Information 7:128 (2021), pp. 1-10.
Pirandola, "Satellite quantum communications: Fundamental bounds and practical security", Physical Review Research 3, 023130 (2021), Published by the American Physical Society, pp. 1-29.
Harney and Pirandola, "Optimal Performance of Global Quantum Networks", arXiv:2104.10701 (2021), pp. 1-14.
Liao et al, "Satellite-Relayed Intercontinental Quantum Network," Physical Review Letters 120, 030501 (2018), arXiv:1801.04418 [quant-ph], pp. 1-10.
"Lab Course Bell's Inequality and Quantum Tomography," Revision Apr. 2020, retrieved from https://www.bing.com/search?q=Lab+Course%3A+Bell%27s+Inequality+and+Quantum+Tomography&cvid=291de55b95764a2e956de3512841e30d&aqs=edge . . . 69i57j69i11004.3083j0j4&FORM=ANAB01&PC=U531, pp. 1-31.
John Preskill, "Quantum Entanglement," California University of Technology, Physics 219/Computer Science 219 Lecture Notes, Chapter 4, Published 2001, pp. 1-28.
U.S. Appl. No. 17/548,418, filed Dec. 10, 2021, Mihir Keshav Bhaskar, et al.
U.S. Appl. No. 17/548,254, filed Dec. 10, 2021, Mihir Keshav Bhaskar, et al.
U.S. Appl. No. 17/548,422, filed Dec. 10, 2021, Antia Lamas Linares, et al.
U.S. Appl. No. 17/548,216, filed Dec. 10, 2021, Desmond O'Neil Davis, et al.
David Drahi, et al. "Certified Quantum Random Numbers from Untrusted Light," Physical Review 10, 041048, 2020, Published by the American Physical Society, pp. 1-32.
U.S. Appl. No. 18/542,464, filed Dec. 15, 2023, Antia Lamas Linares.

\* cited by examiner

METERED DISTRIBUTION OF QUANTUM ENTANGLEMENT

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

BRIEF DESCRIPTION OF THE DRAWINGS

FIG. 4 illustrates the examples of measurement information maintained by the recipients of the distributed quantum entanglement, wherein counter-party measurement basis information has been added and entangled particles measured in the same basis by both recipients have been identified, according to some embodiments.

FIG. 7 illustrates the example of measurement information maintained by recipient B of the distributed quantum entanglement, wherein metered particle state information has been added and information encoded in the distributed quantum entanglement has been decoded by using the metered particle state information to determine whether measurement results correlate or anti-correlate, according to some embodiments.

Figure 1:
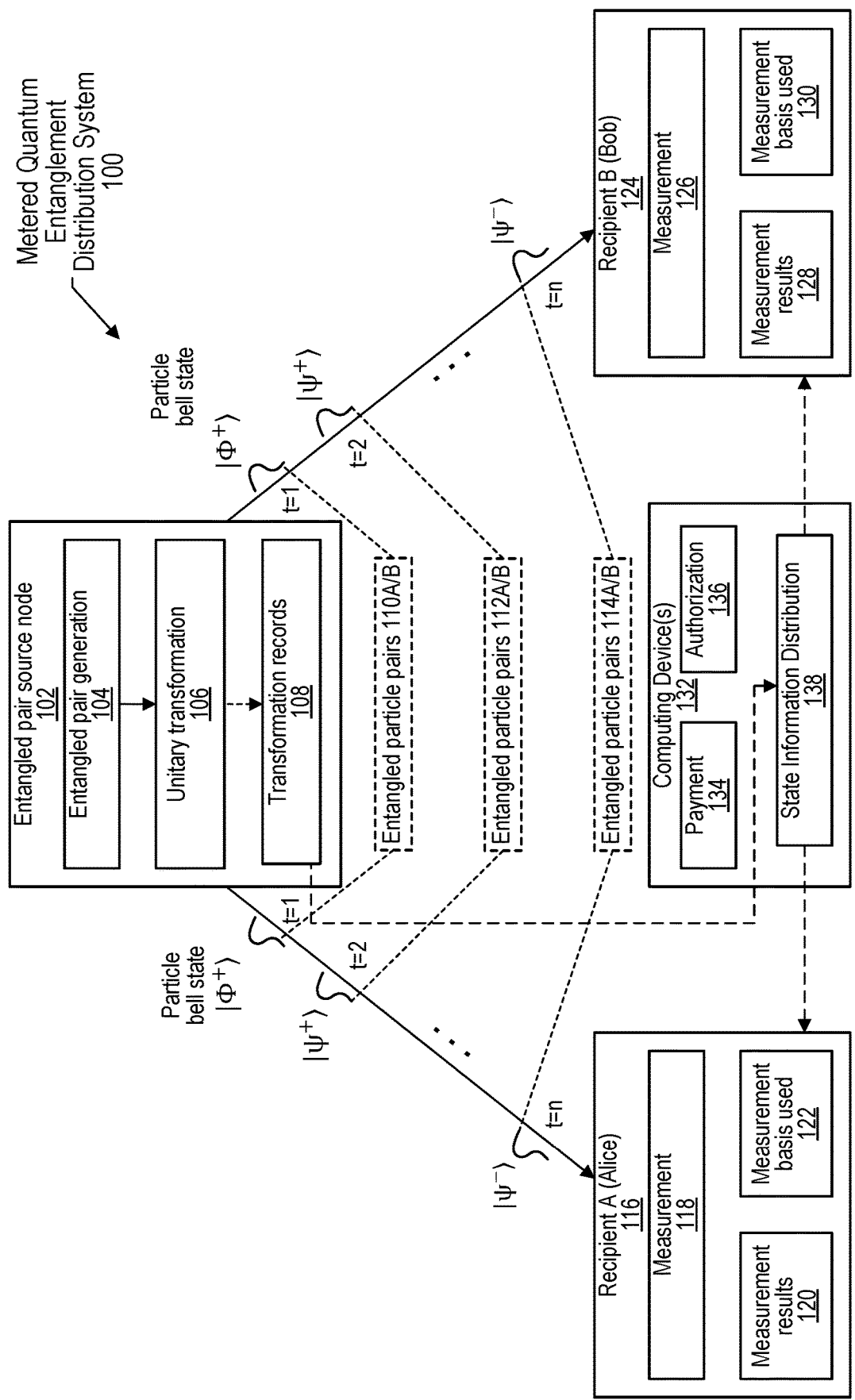
FIG. 1 illustrates a metered quantum entanglement distribution system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for providing metered distributed quantum entanglement as a service to recipients, such as customer endpoints. In some embodiments, metered distributed quantum entanglement may enable recipients of the metered distributed quantum entanglement to establish a shared secret between the recipients. This shared secret may then be used as an encryption key in order to de-crypt other communications shared between the recipients. In some embodiments, the shared secret (e.g., key) may be distributed using metered quantum entangled particles, and encrypted information that is to be de-crypted using the shared secret (e.g., key) may be distributed via other channels, such as traditional network links. However, as opposed to other systems of key distribution that require trust in intermediaries to transmit the key to recipients without leakage of the key, a shared secret distributed using metered distributed quantum entanglement may not require the recipients to place any trust in intermediaries, such as the metered quantum entanglement distribution service, to vouchsafe the secret. For example, the metered quantum entanglement distribution system cannot determine or otherwise access information encoded in a quantum entangled particle, and any attempt to measure the state of the quantum entangled particles by an intermediary would cause the entangled particles to fall out of superposition and would therefore alert the intended recipients of an attempt to eavesdrop. Thus, metered quantum entanglement may be used to distribute highly secretive keys through a trustless intermediate environment, without relying on third parties to maintain the secret during intermediate transmission between the recipients.

As used herein "trust-less" describes an environment wherein access to, and control of, physical media or other equipment is not guaranteed to exclude potential third-parties, such as attempted eavesdroppers. For example, a quantum repeater used to distribute quantum entanglement may be located in a public easement that is accessible to third-parties, thus it may be said to reside in a "trust-less" environment. However, even though the physical hardware being used to perform the quantum entanglement distribution may be accessible by third-parties, the metered quantum entanglement itself that is distributed via the quantum repeater through the "trust-less" environment may be highly trusted because the integrity of communications communicated via quantum entanglement does not rely on a trusted environment to maintain trust. Instead, the physical properties of the entangled quantum particles guarantee trust, because any attempt to eavesdrop is readily detectable by the recipients of the metered quantum entanglement.

However, quantum entangled particle distribution often involves losses, wherein only a fraction of quantum entangled particles distributed from an entangled pair source are successfully received and measured by intended recipients of the distributed quantum entanglement. Thus, in some embodiments, quantum entanglement may be distributed at a rate that far exceeds an amount of quantum entanglement that needs to be received by the recipients in order to communicate information (such as a secret key) encoded in the entangled quantum particles. Also, a rate at which entangled particles are lost or fail to be measured by recipients may fluxuate and/or be hard to predict. Because of this and other factors related to the varying nature of quantum entanglement distribution, charging customers based on a quantity of entangled particles emitted from a source node may be interpreted by the customers as arbitrary because differing amounts of quantum entanglement may be received by the customers even if a rate at which quantum entanglement is emitted at a source node is constant.

In some embodiments, in order to meter quantum entanglement distributed to customers in a way that fairly charges the customers for the quantum entanglement they actually use, a metered quantum entanglement distribution system, as described herein, may be used. In some embodiments, a metered quantum entanglement distribution system includes an entangled pair source node that generates/emits entangled quantum particles. The generated entangled quantum particles may undergo a unitary transformation, such as a rotation, etc. The unitary transformation may transform the entangled quantum particles into a given one of a plurality of states. For example, in some embodiments, respective ones of the entangled quantum particles may be transformed into respective ones of the Bell states, such as $|\phi^+\rangle$, $|\phi^-\rangle$, $|\psi^+\rangle$, or $|\psi^-\rangle$. In some embodiments, the transformations applied to the entangled quantum particles may be selected randomly or in another manner not known by the recipients. Also, different ones of the resulting transformed states may have different properties. For example, measurements of the entangled quantum particles may correlate when transformed into a first transformed state and may anti-correlate when transformed into a different transformed state. Also, in some embodiments, whether measurements of a given pair of entangled quantum particles correlate or anti-correlate may further depend on the measurement basis used and the transformed state. For example, a first transformed state may cause measurement results to correlate when measured in a first measurement basis and anti-correlate when measured in a second measurement basis. Another transformed state may cause measurement results to correlate when measured in the first basis and the second basis. Also, yet another transformed state may cause the measurement results to anti-correlate when measured in the first basis or the second basis.

In some embodiments, a Bell state transformation (e.g., unitary transformation) may be used, in which case the resulting entangled quantum particles may be transformed into any one of the Bell states $|\phi^+\rangle$, $|\phi^-\rangle$, $|\psi^+\rangle$, or $|\psi^-\rangle$. For example, which resulting Bell state a given pair of entangled quantum particles is to be transformed into may be selected randomly or in another manner that is not known and/or difficult to forecast by a customer. In this way, a recipient of the distributed quantum entanglement needs to receive the state information from the metered quantum entanglement distribution system, in addition to receiving distributed quantum entanglement, in order to interpret measurements, e.g., to determine whether the measurements correlate or anti-correlate with measurements taken by a counter-party.

In some embodiments, a customer may request, and only pay for, state information for distributed quantum entanglement that was actually received and measured by the customer. In this way the customer may avoid paying for distributed quantum entanglement that never arrived or that was unable to be measured. Note that since a unitary transformation does not alter the superposition or entanglement properties of the entangled quantum particles with regard to protection against eavesdroppers, the transformation does not compromise the secure secret communication or the lack of a need for trust in intermediaries, such as the metered quantum entanglement distribution service. For example, if state information (e.g. Bell state information) were to be leaked, secrets encoded in the distributed quantum entanglement could not be discerned by third-parties. Instead, the primary down-side of leaked state information would be that customers may be able to interpret measurements of distributed quantum entanglement without paying for the distributed quantum entanglement.

In some embodiments, in addition to, or instead of, payment other triggering conditions may be used to determine when to release state information for distributed quantum entanglement. For example, in some embodiments, a triggering condition may be expiration of a delay period for a delayed delivery of a secret. For example, both recipients of distributed quantum entanglement may receive and measure the entangled pairs that encode a secret, but the issuance of the secret may be delayed for various reasons, wherein releasing the state information enables the recipients to interpret the measurements from the distributed quantum entanglement in order to decipher a shared secret.

In some embodiments, metered quantum entanglement distribution may be used by a quantum entanglement distribution service to meter out and receive payment for distributed quantum entanglement. In some embodiments, a quantum entanglement distribution service includes intermediate nodes located at trusted and/or non-trusted locations, where trust is based on whether or not the intermediate nodes are located within facilities controlled by a service provider or are located at facilities outside of the control of the service provider. Also, in some embodiments, a quantum entanglement distribution service may provide a secure and private mechanism for a customer to provide quantum gates to be executed in a generic quantum circuit at a quantum computing service. The quantum entanglement service may also provide a secure and private mechanism to receive results of execution of the quantum circuit including the securely provided quantum gates wherein the customer does not need to rely on a service provider network hosting the quantum computing service to provide the security and/or privacy. For example, as described in more detail with regard to FIGS. 11-14, a quantum entanglement distribution service may allow a quantum computing service to provide customers with blind quantum computing.

In some embodiments, the features of the metered entanglement distribution system described in FIGS. 1-10 may be incorporated into the quantum entanglement distribution service as described in FIGS. 11-14. For example, in some embodiments the intermediary nodes of a quantum entanglement distribution service may function as entangled source pairs that maintain state information that is later metered out to customers, as described with regard to the metered quantum entanglement distribution system.

In some embodiments, a quantum entanglement distribution service may also comprise computing devices configured to receive a request for distributed quantum entanglement between sets of endpoints, determine a path of network links and intermediate nodes that connect the set of endpoints, and cause sets of entangled quantum particle pairs to be distributed between intermediate nodes, via the determined network links, along the determined path to provide distributed quantum entanglement between the set of endpoints. Distributed quantum entanglement provides a quantum secure connection between the set of endpoints that is protected against interference or eavesdropping along the path, either at trusted or non-trusted locations. For example, in contrast to classical communications that may be intercepted or altered in a communication path, distributed quantum entanglement provides an end-to-end entangled quantum connection that can be monitored at the endpoints to ensure the communication path is not being monitored or altered.

For example, quantum particles may be in a state called superposition, wherein the quantum particles inhabit two states at the same time with different probabilities associated with each state (e.g., 0 and 1, with different probabilities associated with 0 and associated with 1). However, attempts to measure the quantum particles will cause the quantum particles to collapse from the superposition state into one or the other of the states (e.g., 0 or 1). Additionally, sets of quantum particles can be entangled such that the quantum states of the quantum particles are inextricably linked even if separated by large distances. For example, physical properties of entangled quantum particles such as position, momentum, spin, and/or polarization may be perfectly correlated across large distances when entangled. In some cases, such properties may have a correlation such as same or opposite, meaning that if a first quantum particle of an entangled pair of quantum particles has a first spin direction, it's entangled quantum particle partner may have a spin direction that is the same or opposite of the direction of the spin of the first quantum particle of the entangled pair of quantum particles. In some embodiments, a basis of measurement may also be communicated via classical communication channels, such as a basis of measurement indicating an axis on which spin is pointing. Thus, by measuring a spin direction of the first quantum particle of the entangled pair of quantum particles and by knowing the transformed state of the entangled quantum particles (e.g., $|\phi^+\rangle$, $|\phi^-\rangle$, $|\psi^+\rangle$, or $|\psi^-\rangle$), one can automatically determine the spin direction of the partner quantum particle of the entangled pair of quantum particles (e.g., same or different). Any attempt to interfere with the entangled quantum particles by a third party at locations between the endpoints holding the first and second entangled particles of the entangled pair will interrupt the entanglement, wherein such interruption is detectable at the endpoints. Thus, a first customer holding an entangled particle of an entangled pair of quantum particles at a first endpoint and a second customer holding a partner entangled particle of the entangled pair of quantum particles at as second endpoint can be assured that no other party is monitoring or altering communications between the first and second endpoints by observing the entanglement and superposition states of the entangled quantum particles held at either endpoint.

While entanglement distributed between two endpoints via a single pair of entangled quantum particles may provide the benefits described above, other limitations may prevent or inhibit the use of quantum entanglement in such a way wherein communicating entities are directly connected using a single set of entangled quantum particles. For example, infrastructure costs may be inhibitive to provide direct connections using a single set of entangled photons between all parties that may wish to communicate using quantum entanglement. Also, losses along a communication link, such as optical losses along a fiber optic communication link, may limit distances that entanglement may be distributed when distributing quantum particles of a single pair of entangled quantum particles between communicating entities. One approach to dealing with such limitations involves linking together such sets of endpoints by performing quantum measurements at connecting node holding one end of a pair of entangled quantum particles and then using the measured information to relay the information being transmitted using another set of entangled quantum particles. In such an approach, quantum entanglement provides assurances that there is no eavesdropping or interference between the connecting nodes. However, the quantum entanglement is lost at the connecting nodes when the quantum measurements are taken. Thus, in such an approach, eavesdropping or interference is possible at the connecting nodes. For example, a third party could intercept or alter the information being transmitted after quantum measurements are performed at a connecting node and before the information is then relayed using a subsequent set of entangled quantum particles.

In order to overcome such short comings, in some embodiments, a quantum entanglement distribution service, distributes quantum entanglement between endpoints connected via intermediate nodes without breaking the quantum entanglement at any of the intermediate nodes. For example, instead of performing quantum measurements at an intermediate node that disrupt entanglement and/or collapse superposition, a quantum particle of a first set of quantum particles received at the intermediate node via a first network link may be stored in a quantum memory of the intermediate node. Also, a second quantum particle of a second set of quantum particles received at the intermediate node via a second network link may also be stored in the quantum memory of the intermediate node. Additionally, the intermediate node may be configured to perform joint measurements of the first and second quantum particles of the respective entangled pairs received at the intermediate node and stored in the quantum memory of the intermediate node, wherein the joint measurements do not provide any information about the quantum state of the respective quantum particles individually but instead provides information about the correspondence relationship between the two quantum particles. For example, the measurements may indicate that they have a correlation that is the same or opposite. Note, using spin as an example, such measurements do not tell the spin direction of either quantum particle, just the relationship between the two (e.g., they have the same or opposite spin directions). In some embodiments, state information for multiple sets of distributed quantum particles may be stored and the state information, when shared with recipients, may enable the recipients to determine whether particles received by the recipients correlate or anti-correlate (for example taking into account states used by each of the entangled pairs used in a communication path between the recipients).

In some embodiments, a quantum entanglement distribution service may include multiple such intermediate nodes with quantum memories and joint measurement capabilities. The quantum entanglement distribution service may further determine an overall entanglement relationship between quantum particles held at endpoints of distributed quantum entanglement based on joint measurements performed at one or more respective intermediate nodes and respective state information. For example, if an odd number of intermediate nodes generate joint measurements indicating an opposite relationship taking into account relative states, then the quantum entanglement distribution service may indicate to the two endpoints of the distributed entanglement that the quantum particles held at the two endpoints have an "opposite" entanglement relationship. In contrast, if the joint measurements at the intermediate nodes yield an even number of "opposite" joint measurement relationships or only "same" joint measurement relationships, then the quantum entanglement distribution service may indicate to the two endpoints of the distributed entanglement that the quantum particles held at the two endpoints have a "same" entanglement relationship. Thus, the two endpoints, can use the received quantum entanglement relationship information to determine how a measurement taken at the respective endpoint correlates to a measurement taken at the other endpoint of the distributed quantum entanglement e.g., it will be the same or opposite. Note that in such a circumstance, there is no way to determine what the quantum measurement will be based on this quantum entanglement relationship information alone, only that a quantum measurement at the other end of the distributed quantum entanglement will be the same or opposite as a measurement at an opposite end of the distributed quantum entanglement.

In some embodiments, the ability to communicate free from third-party interception or altering via distributed quantum entanglement may be used in a variety of manners. For example, a symmetric encryption key may be distributed between parties using distributed entanglement, wherein quantum measurements are taken at either end of the distributed entanglement to determine bits of the symmetric encryption key. In some embodiments, a basis of measurement may be communicated between the endpoints as well as joint measurements such as "same" or "opposite", as well as state information. For example, such joint measurements, state information, and/or measurement basis may be communicated via a classical communications channel. The basis of measurement may, for example, indicate an axis on which spin is pointing. However, regardless of the basis of measurement "same" or "different" can be applied to this class of entangled states, which makes measurements performed at the respective endpoints unique and is a part of the symmetric encryption key generation protocol.

In some embodiments, classical or quantum data may be communicated using distributed quantum entanglement via quantum teleportation between endpoints sharing distributed entanglement. For example, in quantum teleportation, a first party holding a quantum particle of the distributed entanglement may combine the particle of the distributed entanglement with a qubit storing quantum information that is to be teleported using a two-qubit entangling quantum logic gate. The first party may then measure a change in the particle of the distributed entanglement when combined with the qubit to be teleported. This change may be communicated to the second party holding the other end of the distributed entanglement. In some embodiments, a basis of measurement may be communicated between the endpoints, for example via a classical communications channel. The basis of measurement may, for example, indicate an axis on which spin is pointing. Note, the measurement does not indicate the actual quantum information that is being communicated, just how the entangled particle of the distributed entanglement changed when combined with the qubit storing the quantum information to be teleported. The other party holding the other particle of the distributed quantum entanglement at the other end of the distributed entanglement can then re-create the quantum information being teleported by observing how the particle of the distributed entanglement changed and knowing the measurement information communicated form the first party sending the quantum information via quantum teleportation.

Thus, in some embodiments, distributed entanglement may be used to distribute data such as bits of an encryption key, data such as quantum information to be used by a quantum computer, or data such as may be used by a classical computer. The data may be transmitted via a quantum secure connection that can be positively verified to be secure such that there is a guarantee that no other party is eavesdropping or altering the data being transmitted. Thus, customers of a quantum entanglement distribution service can directly and easily verify that their data is never exposed through the communications pipeline, independent of any third-party hardware or service provider. Such communications may be referred to as "trust-less" communications because the communicating parties do not need to rely on trust in a service or infrastructure provider to provide security of the communications infrastructure. In some embodiments, an entanglement distribution service may include intermediate nodes at varied geographic locations that enable entanglement distribution across continents (e.g., the continental United States). Also, in some embodiments, an entanglement distribution service may include satellite based intermediate nodes that enable entanglement distribution across continents and/or between continents (e.g., via satellite network links).

In some embodiments, customers of a quantum entanglement distribution service may possess or may receive from the distributed entanglement service a photon detector that connects to a fiber optic channel. Such a photon detector may enable a customer to communicate via distributed entanglement. In some embodiments, a customer may not need to acquire or possess a quantum computer, but may instead couple a classical computer to a photon detector in order to communicate using distributed entanglement.

In some embodiments, quantum memories included in intermediate nodes may be implemented using various quantum memory technologies, such as silicon-vacancy in diamond (SiV), nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc.

In some embodiments, a quantum entanglement distribution service may include various types of endpoints or nodes such as:

A customer node, which may be as simple as a photon detector coupled with a fiber optic modem and/or a laser coupled with a fiber optic modem. In some embodiments, a customer node may be more complex, such as including a quantum sensor or quantum computer. In some embodiments, ancilla qubits of a quantum circuit may be connected via distributed entanglement to ancilla qubits of a remote quantum circuit, such as at a quantum computing service or a quantum hardware provider.

A quantum repeater, which may be located in an isolated location in a trust-free location. For example, a quantum repeater node may be installed at locations along existing fiber optic cable networks, wherein fiber optic links of the existing fiber optic cable networks are used to distributed entangled photons via the installed repeater nodes of the quantum entanglement distribution service.

An entangled particle source node that is located between repeater nodes and/or between a repeater node and a customer node (or service provider node). The entangled particle source node may generate pairs of entangled particles, wherein one of the entangled particles of the pair is sent from the entangled particle source node to a first node connected to the entangled particle source node via a first network link and a second one of the entangled particles of the pair is sent from the entangled particle source node to a second node connected to the entangled particle source node via a second network link. Thus, instead of requiring entangled particles to travel a full distance between repeater nodes, instead entangled particles may travel approximately half a distance between repeater nodes. For example, an entangled particle source node may be located at a mid-point in a network link between repeater nodes and may provide respective halves of a pair of entangled particles to the respective repeater nodes between which the entangled particle source node is located. Note that an entangled particle source node included in a network link provides an advantage of service as a source of entanglement that would otherwise have to be generated in some other way, for example by alternatively using a quantum memory directly to emit photons, which may be more challenging and may result in lower bandwidths.

An entangled particle source node that is co-located at a customer endpoint, wherein the entangled particle source node is configured to generate an entangled set of particles, wherein one of the entangled pair is held at the customer endpoint and the other entangled particle of the pair is transmitted via a communications link such as a fiber link or an optical ground station/free-space channel that connects the customer endpoint to an intermediate node controlled by the quantum entanglement distribution service.

A data center node or service provider node may also include a repeater node, but may be located within a trust boundary of a service provider network. Thus, such a node may interface with classical computing resources of the data center and/or extend entanglement to quantum computing resources of the data center or of a quantum hardware provider associated with the service provider network. This may allow a customer of a service provider network to securely access classical and/or quantum computing resources of the service provider network allocated to the customer via a quantum secure connection enabled using distributed quantum entanglement.

A quantum computer node that provides blind quantum computing capability for a customer to securely and privately submit quantum gates to be included in a generic quantum circuit and to receive results of execution of the quantum circuit including the submitted gates, wherein the results are returned to the customer in a secure and private manner.

FIG. 1 illustrates a metered quantum entanglement distribution system, according to some embodiments.

Metered quantum entanglement distribution system 100 includes entangled pair source node 102 and computing devices 132, which distribute metered quantum entanglement to recipients 116 and 124. For simplicity of illustration a single entangled pair source node 102 is illustrated.

Figure 11:
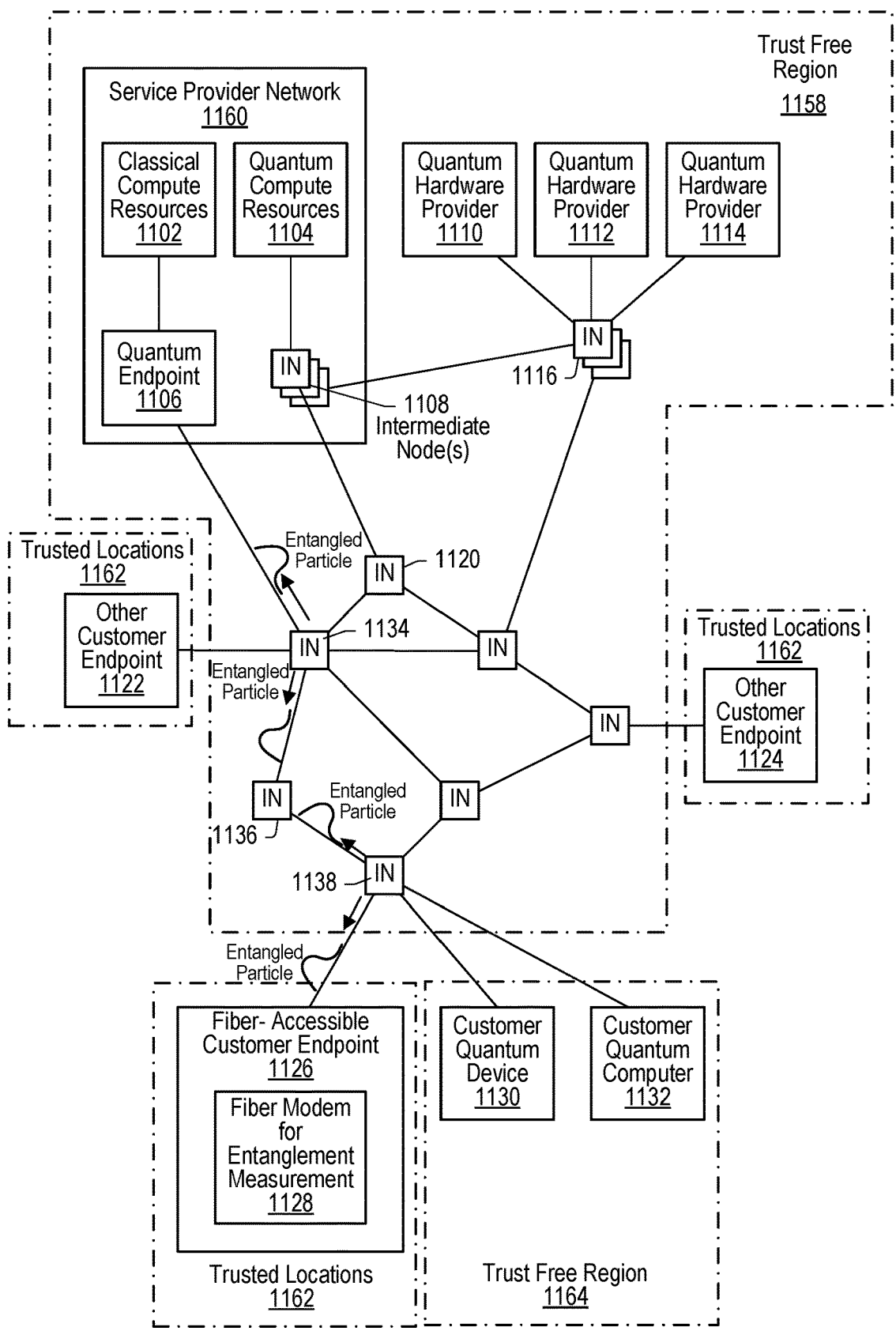
FIG. 11 illustrates resources of a service provider network that provide quantum entanglement distribution to customer endpoints connected to intermediate nodes in a trust-free region outside of the trusted locations of the service provider network, according to some embodiments.
Figure 12:
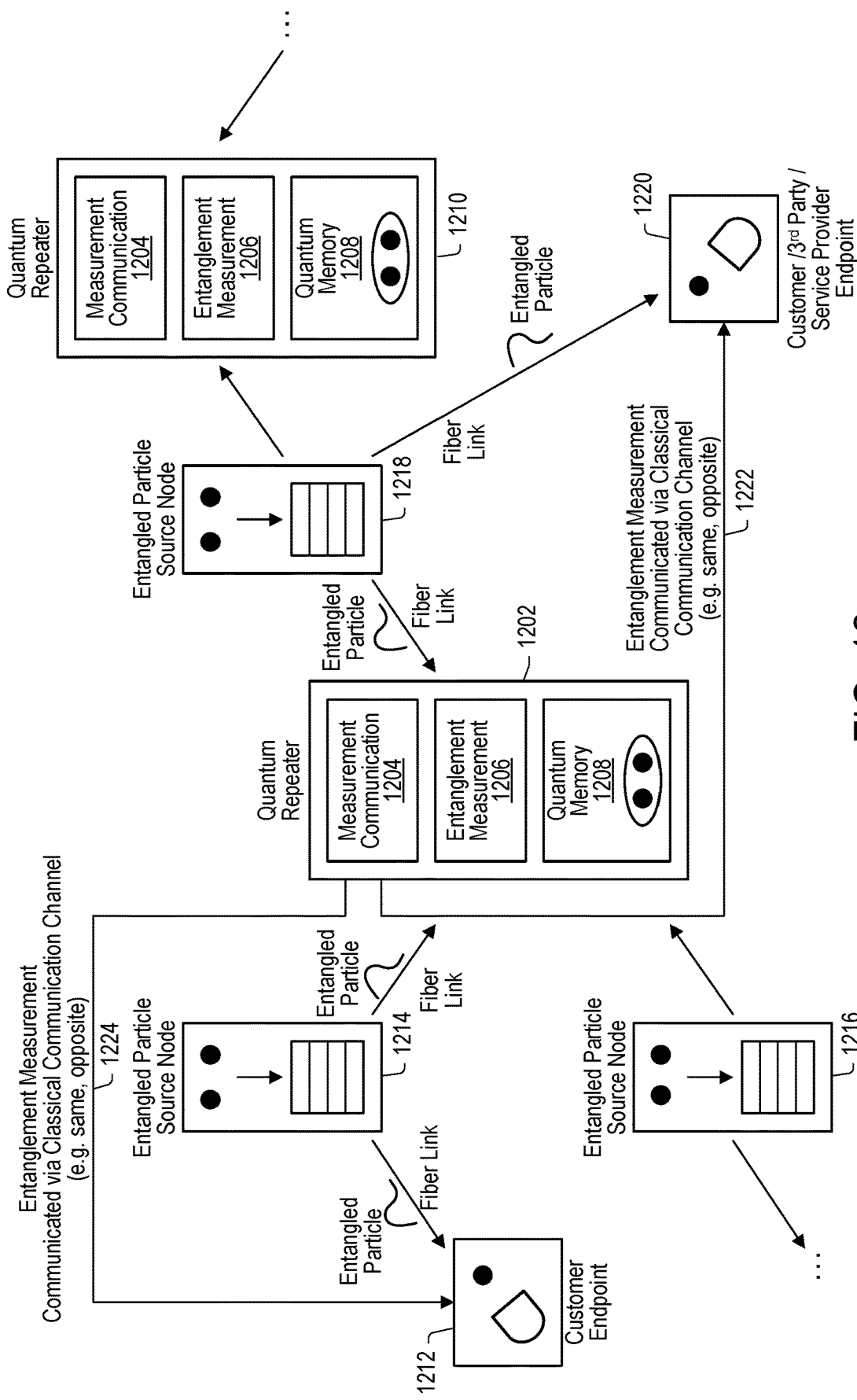
FIG. 12 illustrates intermediate nodes used in entanglement distribution, wherein the intermediate nodes distribute entangled particle pairs (e.g., pairs of optical photons) via network links to distribute entanglement between a set of endpoints for which entanglement distribution has been requested, according to some embodiments.
Figure 13:
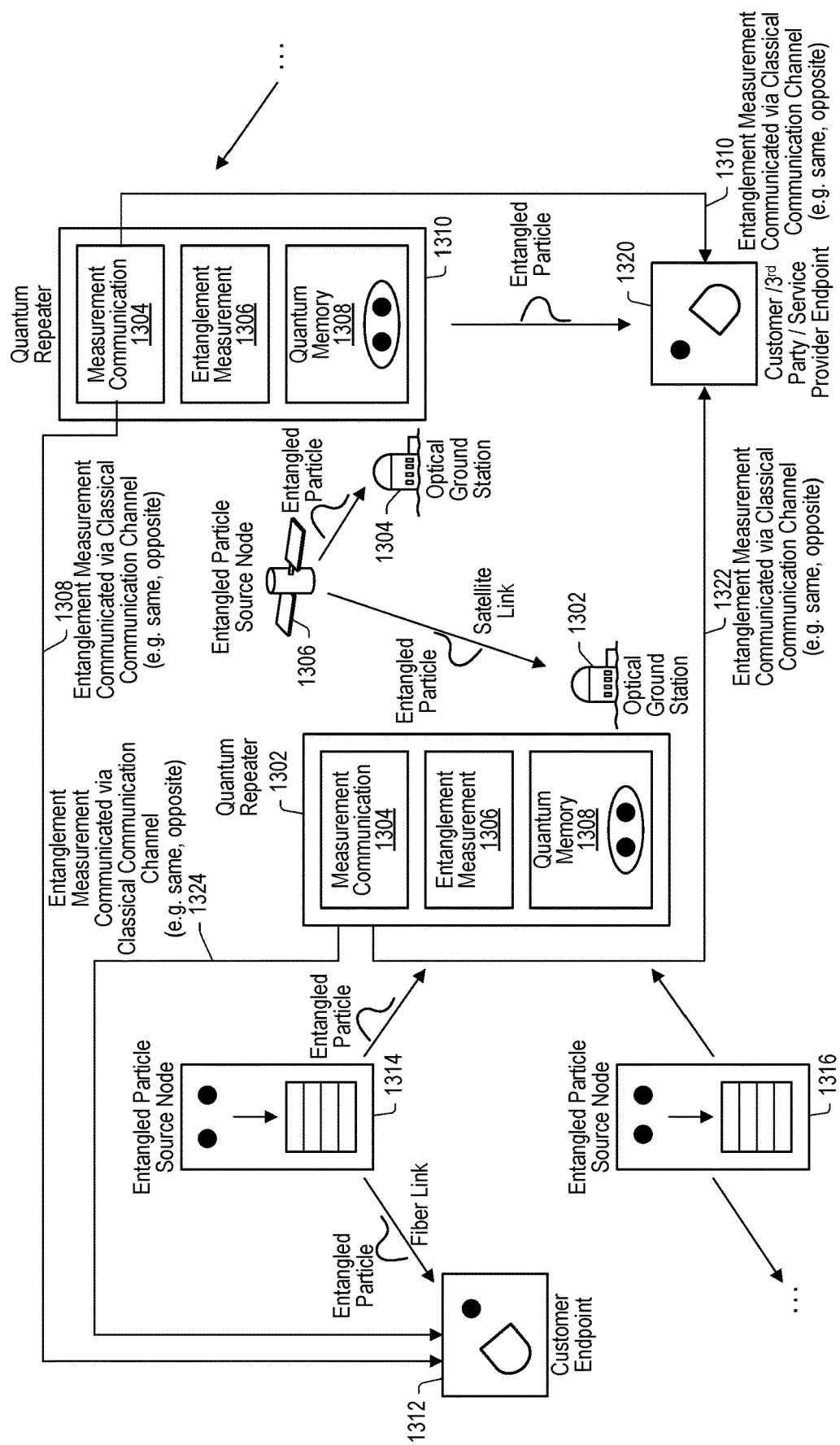
FIG. 13 illustrates another example of intermediate nodes used in entanglement distribution, wherein at least some of the intermediate nodes are connected via satellite links, according to some embodiments.
Figure 14:
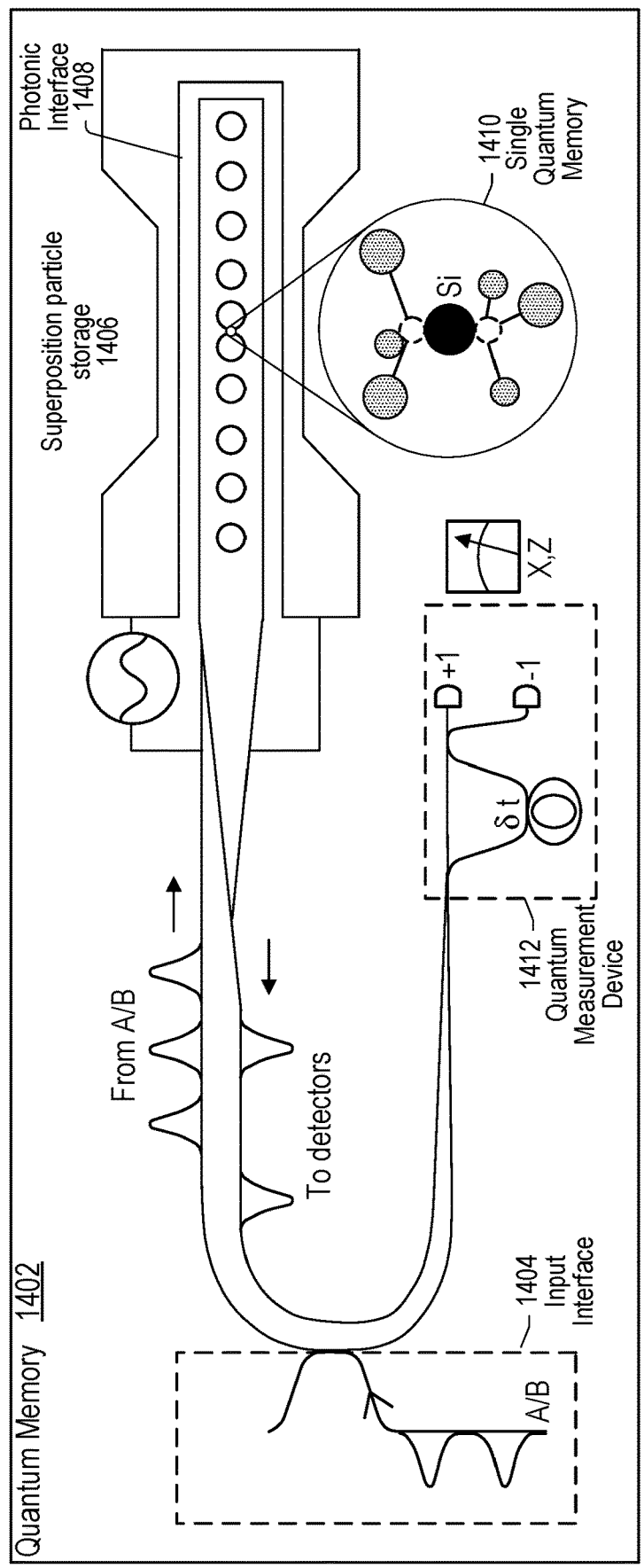
FIG. 14 illustrates an example quantum memory that may be included in an intermediate node, according to some embodiments.

However, in some embodiments, multiple entangled pair source nodes may be linked together in a network to distribute metered quantum entanglement to recipients, such as shown in the quantum entanglement distribution services illustrated in FIGS. 11-13. Also, in some embodiments, entangled pair source nodes may be included in quantum repeaters that include a quantum memory such as shown in FIG. 14.

Entangled pair source node 102 includes entangled pair generation 104, which may include a laser, or other source, that emits pulses that pass through a non-linear crystal to generate the entangled quantum pairs. In some embodiments, the laser may be pulsed such that entangled pairs are emitted during known time intervals. Also, in some embodiments, a continuous wave laser may be used, in which case entangled pairs are emitted at varying and/or random intervals. However, differences in time of emission of the entangled particles may be used to match up received quantum particles with records of state information for the emitted entangled quantum particles. In some embodiments, recipient 116 and recipient 124 may have clocks that are synchronized with a clock of entangled pair source node 102, but this is not strictly necessary. Because the photons of the entangled pairs arrive in a highly correlated manner at each recipient, patterns of when the photons were received may be used to determine how the received photons match with stored state information for emitted entangled pairs without having to rely on clock time synchronization. In some embodiments, a reference signal, such as a light pulse, may be emitted between emission of entangled quantum pairs, wherein the light pulse is used to demarcate intervals of changing state.

The entangled particles emitted via entangled pair generation 104 pass through unitary transformation 106, which applies a unitary transformation, such as a spin to one or more of the entangled particles. The unitary transformation may alter a correspondence relationship between the entangled particles. For example, in a first state, measurements of the entangled particles may correlate, and, in another state, measurements of the entangled particles may anti-correlate. In some embodiments, unitary transformation 106 may transform the emitted entangled particles, randomly, into a given one of a plurality of possible transformed states, such as the Bell states. For example, any one of the Bell states $|\phi^+\rangle$, $|\phi^-\rangle$, $|\psi^+\rangle$, or $|\psi^-\rangle$ may be selected randomly to be used as a transformation for a given emitted entangled particle pair. In some embodiments, other methods may be used to select the transformation in a manner that is difficult for customers to anticipate.

In some embodiments, whether measurements correlate or anti-correlate may depend both on the transformation state and the basis state used to perform measurements on the received entangled particles. For example, in a first Bell state $|\phi^+\rangle$, measurement results of the entangled particles may correlate when measured in a same first basis (such as horizontal/vertical), and may correlate when measured in a same second basis (such as diagonal). In a second Bell state $|\phi^-\rangle$, measurement results of the entangled particles may correlate when measured in the same first basis (e.g., horizontal/vertical), and anti-correlate when measured in the same second basis (e.g., diagonal). In a third Bell state $|\psi^+\rangle$, measurement results of the entangled particles may anti-correlate when measured in the same first basis (e.g., horizontal/vertical), and correlate when measured in the same second basis (e.g., diagonal). In a fourth Bell state $|\psi^-\rangle$, measurement results of the entangled particles may anti-correlate when measured in the same first basis (e.g., horizontal/vertical), and anti-correlate when measured in the same second basis (e.g., diagonal). As can be seen, without knowledge of the transformed state (e.g., Bell state) recipients of entangled quantum particles may not readily determine a shared secret because the recipients cannot determine if respective measurements correlate or anti-correlate (without knowledge of the state information).

Records of which transformations were applied to which entangled particles distributed from the entangled pair source node 102 are stored in transformation records 108 and may be provided to recipients 116 and 118 in various ways. For example, in some embodiments, transformation records 108 are transmitted to computing devices 132 of the metered quantum entanglement distribution system 100. As an example, the transformation records may indicate that entangled particle pairs 110A/B were distributed in the $|\phi^+\rangle$ state, entangled particle pairs 112A/B were distributed in the $|\psi^+\rangle$ state, entangled particle pairs 114A/B were distributed in the $|\psi^-\rangle$ state, and so on. In some embodiments, computing devices 134 may include a payment interface or other record library to determine whether or not customers (e.g. recipients 116 and/or 124) have paid or otherwise been authorized to receive metered distributed quantum entanglement. If so, authorization module 136 may generate an indication of authorization to distribute the state information, for example, via state information distribution 138, to the recipients 116 and 124. While shown as residing in computing devices 132, in some embodiments state information distribution 138 may be implemented in a distributed manner across multiple computing devices, for example in some embodiments state information may be directly distributed from computing devices included in entangled pair source nodes 102 or via other intermediary networking devices.

Recipient A (Alice) 116 may measure 118 the received entangled quantum particles and store the measurement results 120 as well as the measurement basis used 122. Likewise, recipient B (Bob) 124 may measure 126 the received entangled quantum particles and store the measurement results 128 as well as the measurement basis used 130.

Figure 2:
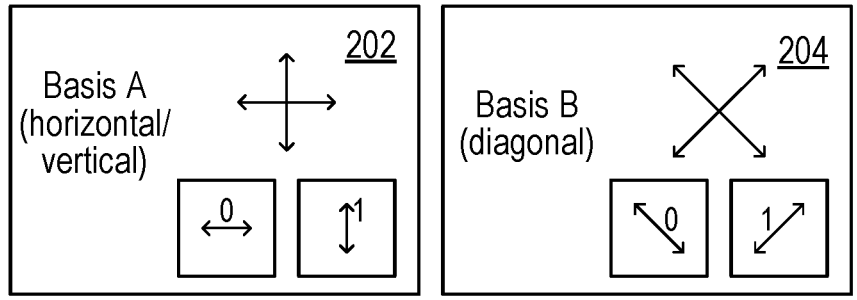
FIG. 2 illustrates examples of measurement information maintained by recipients of distributed quantum entanglement and state information maintained by the metered quantum entanglement distribution system, wherein the recipients need to receive counter-party measurement basis information and metered particle state information in order to enable the recipients to interpret information securely encoded in the distributed quantum entanglement, according to some embodiments.

FIG. 2 illustrates examples of measurement information maintained by recipients of distributed quantum entanglement and state information maintained by the metered quantum entanglement distribution system, wherein the recipients need to receive counter-party measurement basis information and metered particle state information in order to enable the recipients to interpret information securely encoded in the distributed quantum entanglement, according to some embodiments.

For example, Alice's measurement results are shown in table 208 and Bob's measurement results are shown in table 210. The recorded state information is shown in record 206, but has not yet been provided to Alice or Bob. Also, measurement basis conventions are shown in boxes 202 and 204 for the horizontal/vertical basis and the diagonal basis, respectively.

Figure 3:
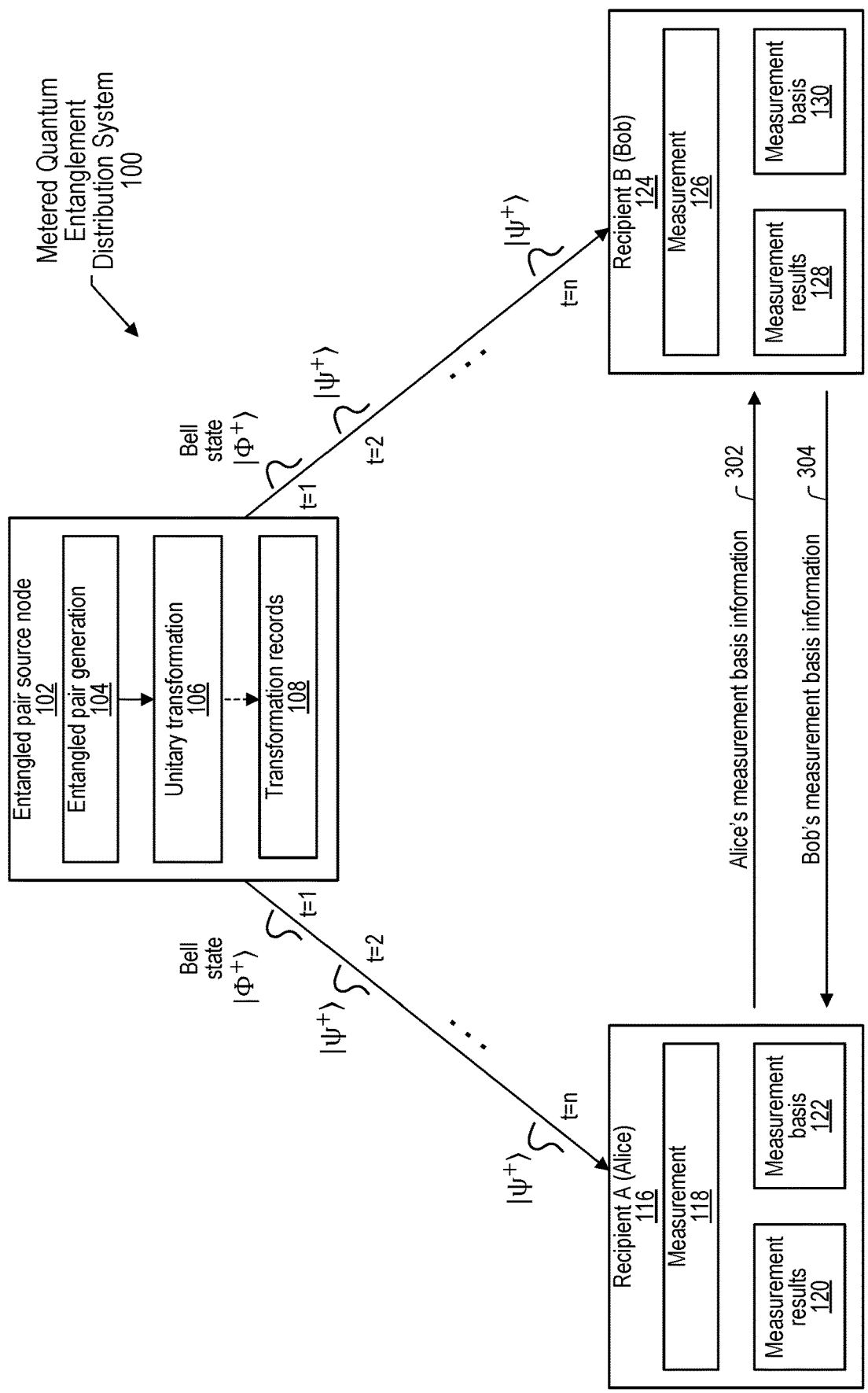
FIG. 3 illustrates the recipients of the distributed quantum entanglement exchanging counter-party measurement basis information in order to identify entangled particles measured in the same basis by both recipients, according to some embodiments.

FIG. 3 illustrates the recipients of the distributed quantum entanglement exchanging counter-party measurement basis information in order to identify entangled particles measured in the same basis by both recipients, according to some embodiments.

Communications 302 and 304 may share measurement basis information 122 and 130 between recipient 116 (Alice) and recipient 124 (Bob). In some embodiments, various networking links may, such as conventional private or pubic networks, may be used to transmit the measurement basis information. Recall, that in order to determine a bit of a secret, the measurement results, the measurement basis, and the state are needed. Thus, as long as the measurement results are not transmitted in a manner that is susceptible to eavesdropping, transmission of the measurement basis information and the state information via such traditional networks does not degrade the secrecy of the distributed quantum entanglement. In some embodiments, it may not be necessary for both recipient 116 (Alice) and recipient 124 (Bob) to share their measurement basis information with the other recipient. For example, recipient 116 (Alice) could receive recipient 124 (Bob's) measurement basis information 130 and determine which entangled particles both Alice and Bob measured in the same measurement basis. Alice could then provide Bob information indication which particles were measured in the same measurement basis without necessarily providing Bob measurement basis information 122.

Figure 4:
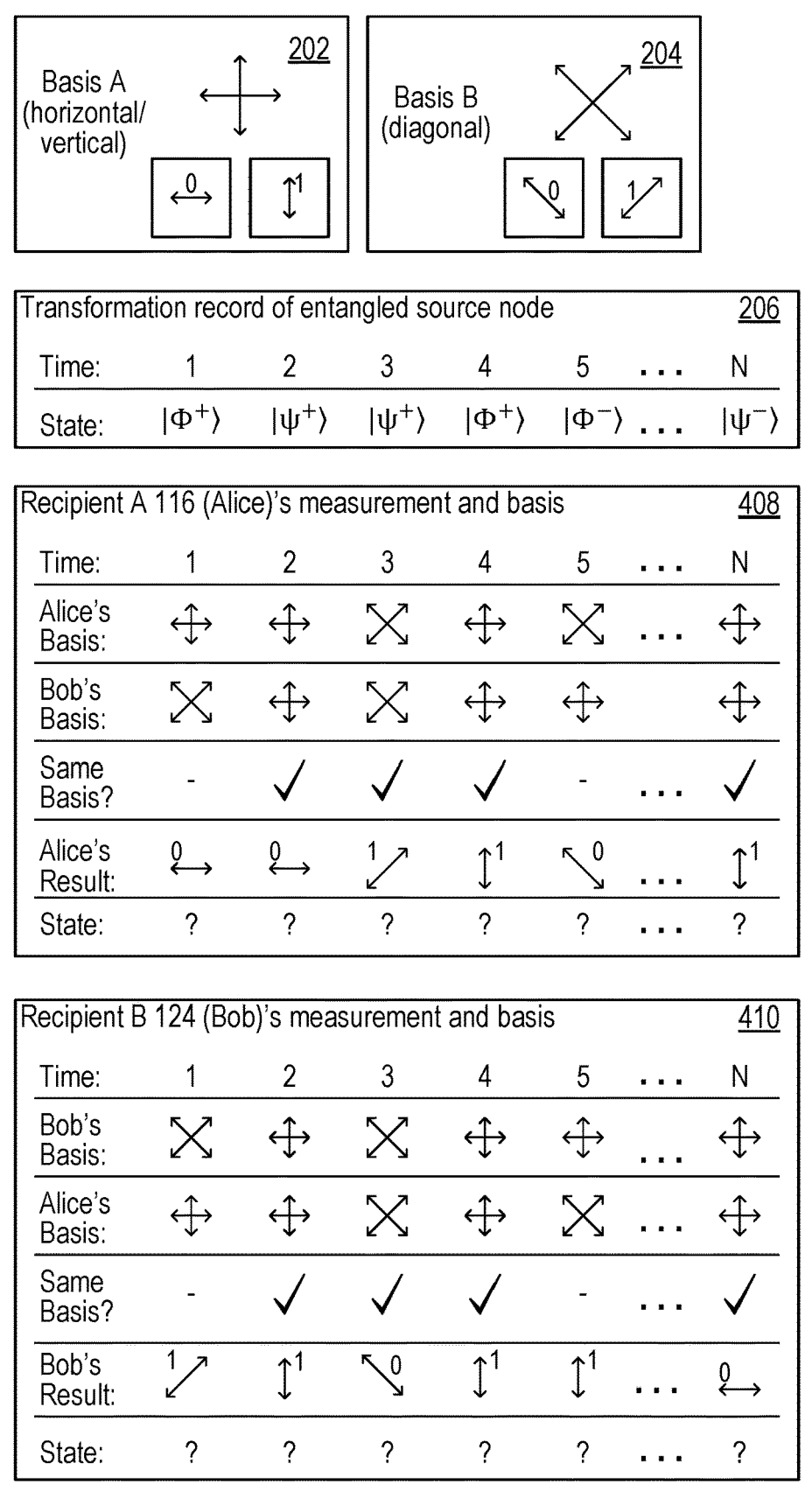

FIG. 4 illustrates the examples of measurement information maintained by the recipients of the distributed quantum entanglement, wherein counter-party measurement basis information has been added and entangled particles measured in the same basis by both recipients have been identified, according to some embodiments.

For example, Alice's measurement results along with the shared measurement basis information for Bob are shown in table 408. Also entangled particles for which Bob used the same measurement basis as Alice are indicated. Similarly in table 410 Bob's measurement results along with the shared measurement basis information for Alice are shown. Additionally, table 410 indicates that the same entangled particles (2, 3, 4 and N) were measured in the same basis by Alice. Thus, Alice and Bob can use entangled particles 2, 3, 4, and N to decode portions of a shared secret. However, at this stage, without the knowledge of the state information, Alice and Bob do not know if the measurement results correlate or anti-correlate for each of the entangled particles 2, 3, 4, and N.

Figure 5:
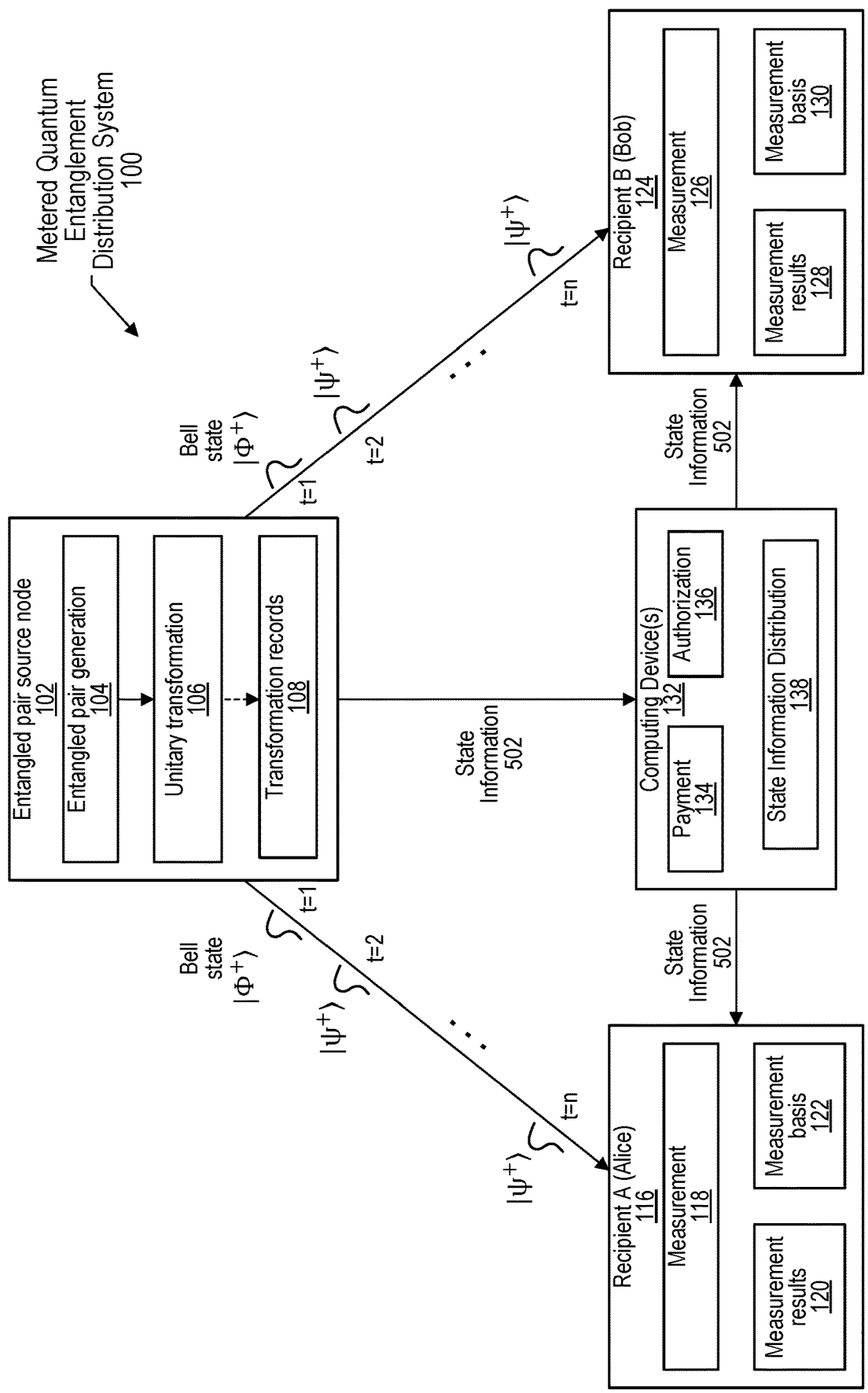
FIG. 5 illustrates the metered quantum entanglement distribution system providing metered particle state information to the recipients of the distributed quantum entanglement, according to some embodiments.

FIG. 5 illustrates the metered quantum entanglement distribution system providing metered particle state information to the recipients of the distributed quantum entanglement, according to some embodiments.

Quantum state information distribution 502 provides recipient 116 (Alice) and recipient 124 (Bob) with the state information needed to determine whether the measurement results of Alice correlate or anti-correlate with Bob's measurement results and vice-versa. As discussed above, in some embodiments, release of state information 502 may be contingent upon receiving payment for the distributed entanglement or otherwise contingent upon authorization being granted.

Figure 6:
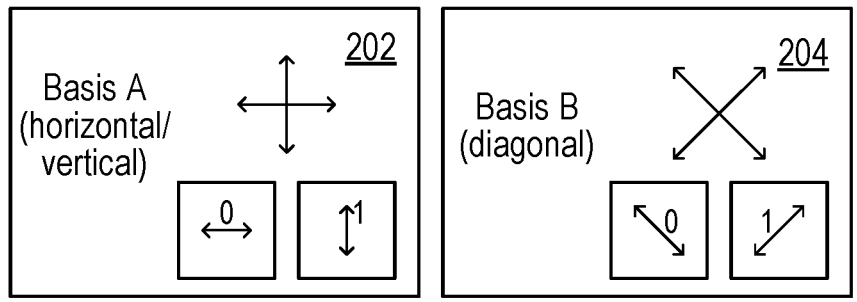
FIG. 6 illustrates the example of measurement information maintained by recipient A of the distributed quantum entanglement, wherein metered particle state information has been added and information encoded in the distributed quantum entanglement has been decoded by using the metered particle state information to determine whether measurement results correlate or anti-correlate, according to some embodiments.

FIG. 6 illustrates the example of measurement information maintained by recipient A of the distributed quantum entanglement, wherein metered particle state information has been added and information encoded in the distributed quantum entanglement has been decoded by using the metered particle state information to determine whether measurement results correlate or anti-correlate, according to some embodiments.

As can be seen in table 608, the state information has been added, which enables Alice to determine whether her results correlate or anti-correlate with those of Bob. For example, by knowing the state information, Alice has full knowledge of Bob's measurement results by knowing which measurement results correlate and anti-correlate. In this case, a quantum key distribution (QKD) code is decoded from the shared quantum entanglement comprising bits 0, 1, 1, 1 . . . 1. Note that the QKD code may include more or fewer bits than shown in FIGS. 6 and 7. In some embodiments Alice and Bob may follow an agreement or other standard that establishes which of the two parties is to switch measurement results that anti-correlate. For example, Alice may keep the measurement results, as measured, when determining bits of a QKD code and Bob may invert measurement results that anti-correlate, such that Bob ends up with the same bits in his QKD code as are included in Alice's QKD code.

Figure 7:
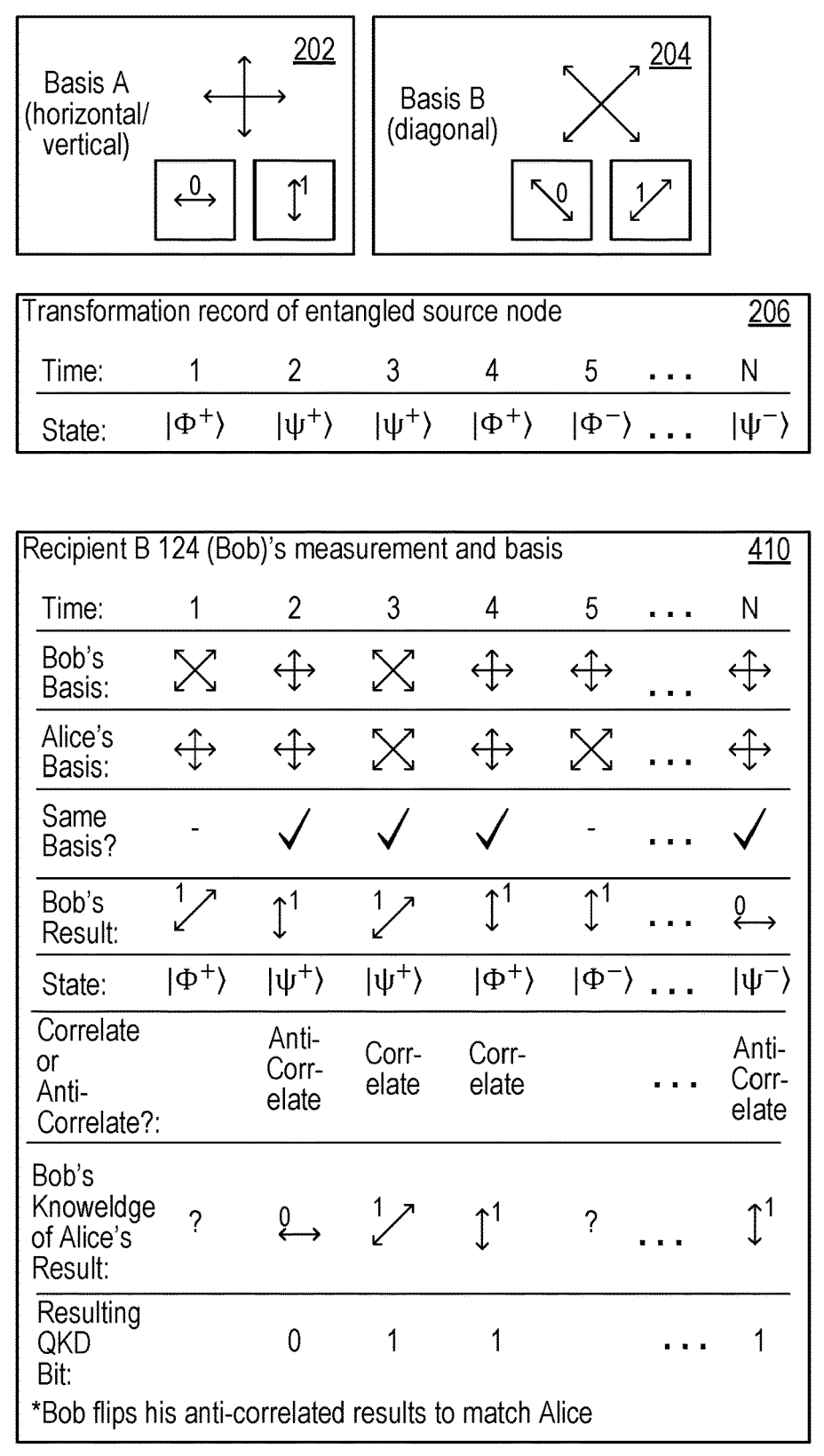

FIG. 7 illustrates the example of measurement information maintained by recipient B of the distributed quantum entanglement, wherein metered particle state information has been added and information encoded in the distributed quantum entanglement has been decoded by using the metered particle state information to determine whether measurement results correlate or anti-correlate, according to some embodiments.

As can be seen in table 708, Bob also receives the state information and determines Alice's measurement results and the same secret e.g., a quantum key distribution code comprising bits 0, 1, 1, 1 . . . 1.

Figure 8:
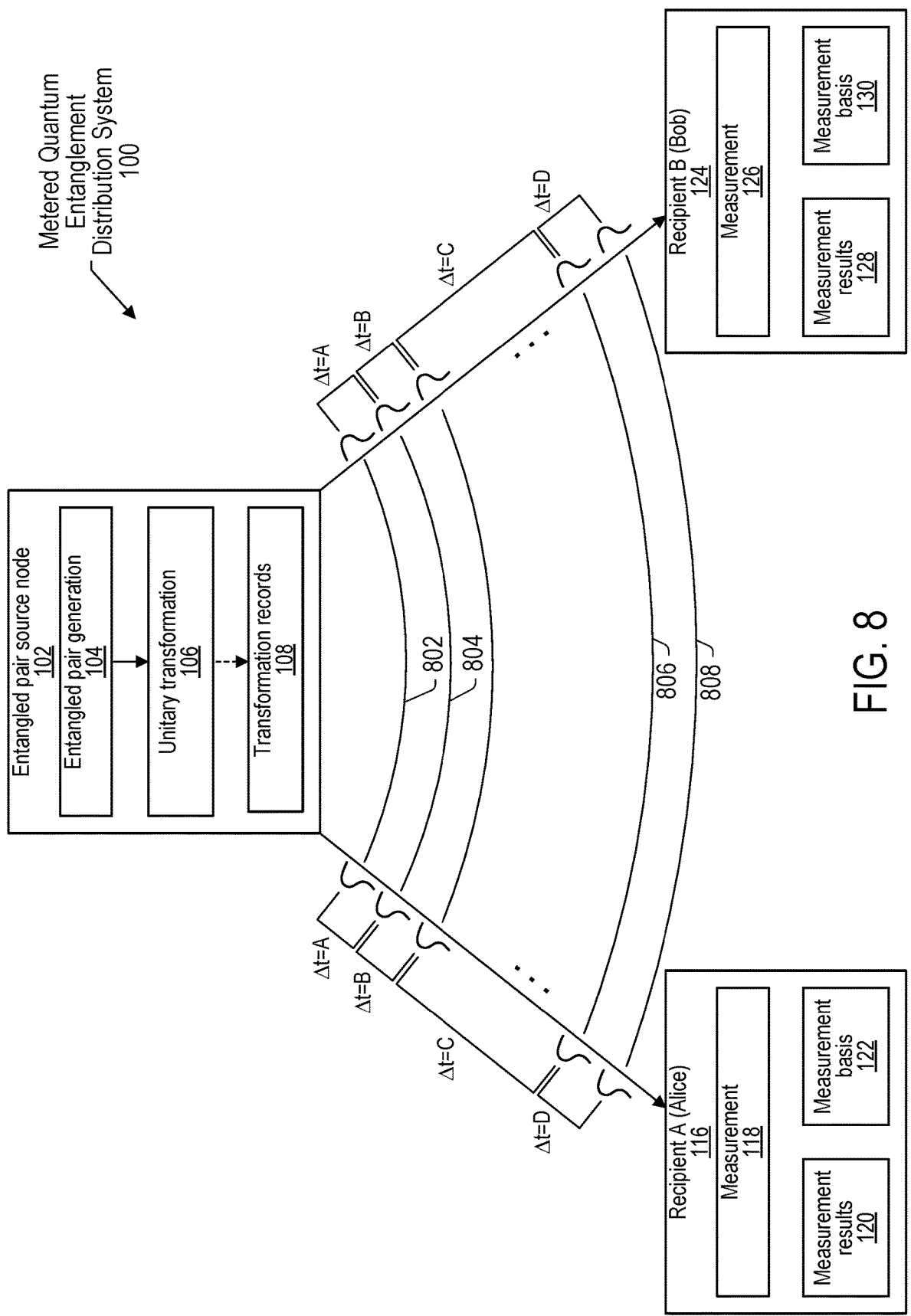
FIG. 8 illustrates a metered quantum entanglement distribution system, wherein entangled quantum particles are distributed according to a time-varying pattern or randomly, according to some embodiments.

FIG. 8 illustrates a metered quantum entanglement distribution system, wherein entangled quantum particles are distributed according to a time-varying pattern or randomly, according to some embodiments.

In some embodiments, instead of distributing entangled quantum particles in a manner that is delineated by time windows, varying emission patterns may be used and matching of measurements to state information may be accomplished by matching the emission patterns and measurement patterns, such as based on time intervals between measurements and time intervals between waves of emission. For example, in FIG. 8 entangled particle pairs 802, 804, 806, and 808 may be emitted at varying time intervals that can be used to match to measurement time intervals of when recipient 116 (Alice) and recipient 124 (Bob) received and measured the entangled particles included in entangled particle pairs 802, 804, 806, and 808.

Figure 9:
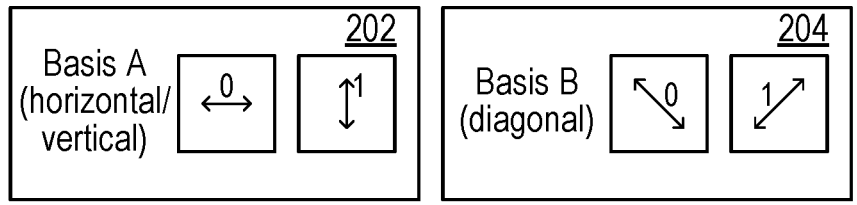
FIG. 9 illustrates examples of measurement information maintained by recipients of distributed quantum entanglement and state information maintained by the metered quantum entanglement distribution system, wherein distributed quantum entanglement is distributed according to a time-varying pattern, or randomly, according to some embodiments.

FIG. 9 illustrates examples of measurement information maintained by recipients of distributed quantum entanglement and state information maintained by the metered quantum entanglement distribution system, wherein distributed quantum entanglement is distributed according to a time-varying pattern, or randomly, according to some embodiments.

As can be seen in FIG. 9, instead of using time synchronization, state information 906 may include a pattern showing emission intervals and corresponding states that can be matched to times of receipt of Alice and Bob.

Figure 10:
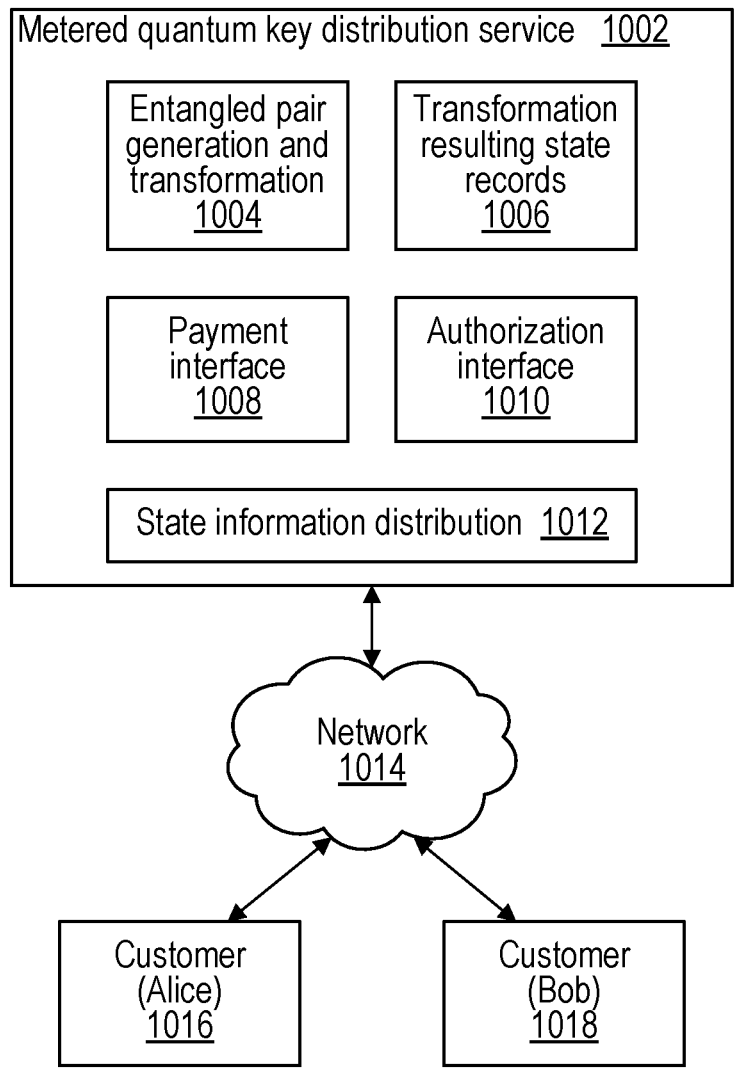
FIG. 10 is a block diagram illustrating components of a metered quantum key distribution service that may utilize a metered quantum entanglement distribution system (as show in FIG. 1) to distribute quantum secure secrets, such as encryption keys, according to some embodiments.

FIG. 10 is a block diagram illustrating components of a metered quantum key distribution service that may utilize a metered quantum entanglement distribution system (as show in FIG. 1) to distribute quantum secure secrets, such as encryption keys, according to some embodiments.

In some embodiments, a metered quantum key distribution service 1002 may be implemented as a network connected service and include entangled pair generation and transformation elements 1004, such as a set of entangled pair source nodes 102. Also, the metered quantum key distribution service 1002 may include one or more computing devices, such as computing devices 132, that implement storage of resulting transformation records 1006, as well as payment interface 1008, authorization interface 1010, and state information distribution 1012.

In some embodiments, customers 1016 and 1018, such as Alice and Bob, may request distributed entanglement, submit payments, receive state information, and/or exchange measurement basis information via a network such as network 1014, which may be a public or private network.

FIG. 11 illustrates resources of a service provider network that provide quantum entanglement distribution to customer endpoints connected to intermediate nodes in a trust-free region outside of the trusted locations of the service provider network, according to some embodiments.

In some embodiments, metering of distributed quantum entanglement by transforming entangled quantum particles and later providing state information in a metered way, such as in response for payment, may be implemented in a larger quantum entanglement distribution network such as shown in FIGS. 11-14.

In some embodiments, distribution of quantum entanglement may include distribution using multiple intermediate nodes and may be used to distribute quantum entanglement to various types of endpoints. In some embodiments, locations outside of the trust guarantees of service provider network 1160 may include intermediate nodes 1120 located in trust free region 1118. Also, in some embodiments service provider network 1160 may further include intermediate nodes 1108. Additionally, in some embodiments, intermediate nodes 1116, which may be included in trusted locations 1162 or trust free region 1118, may connect service provider network 1160 to quantum hardware providers 1110, 1112, and/or 1114 that offer one or more types of quantum computing resources to customers of service provider network 1160. For example, quantum hardware providers 1110, 1112, and 1114 may be connected to service provider network 1160 via intermediate nodes 1116 and/or may be connected to other intermediate nodes in trust free region 1118 via intermediate nodes 1116. Additionally, various different customers of service provider network may be connected in a way that distributed quantum entanglement can be distributed to the various other customers. For example, other customer endpoints 1122 and 1124 are connected to intermediate nodes 1120 in trust free region 1118.

In some embodiments, a customer endpoint may include one or more types of endpoint devices. For example, in some embodiments a customer endpoint may include a fiber-accessible customer endpoint 1126, which is connected to a fiber modem for entanglement measurement 1128. Additionally, or alternatively a customer endpoint may include a customer quantum device 1130, for example for performing quantum measurements, or may include a full-fledged customer quantum computer 1132.

In some embodiments, customer quantum computing device 1130 and/or customer quantum computer 1132 may further include a conversion interface. For example, in some embodiments, the conversion interface may convert a transmission frequency of a received particle to a different frequency and/or convert a frequency of an outgoing particle to a different frequency. For example, in some embodiments, fiber optical links may transmit photons using different frequency wavelengths and such variations may be adjusted via a conversion interface of customer quantum computing device 1130 and/or customer quantum computer 1132.

In some embodiments, the classical computing services of a service provider network 1160 may be implemented using classical computing resources 1102. Also, in some embodiments, the quantum computing services may be implemented using quantum computing resources 1104 of service provider network 1160 or may be implemented using quantum processing units (QPUs) of quantum hardware providers 1110, 1112, or 1114 connected to service provider network 1160 via intermediate nodes 1108 and/or 1116 (as shown in FIG. 11).

As an example, a customer associated with fiber-accessible customer endpoint 1126 may request entanglement distribution between fiber-accessible customer endpoint 1126 and service provider network 1160 in order to provide quantum secure communication between fiber-accessible customer endpoint 1126 and classical compute resources 1102 providing classical computing services to the customer. In response, routing may cause intermediate node 1134 (which may be an entangled particle source node) to distribute respective particles of entangled particle pairs to quantum endpoint 1106 and intermediate node 1136 (which may be a quantum repeater node). Also, routing may cause intermediate node 1138 (which may be an entangled particle source node) to distribute respective particles of entangled particle pairs to fiber-accessible customer endpoint 1126 and intermediate node 1136 (e.g., a quantum repeater node). Additionally, routing may instruct intermediate node 1136 to perform joint quantum measurements on the received entangled quantum particles to extend the quantum entanglement such that quantum entanglement is distributed between quantum endpoint 1106 and fiber-accessible customer endpoint 1126. Because quantum endpoint 1106 is within trusted location 1162 (e.g., located at a data center with classical compute resources 1102), secure communications may be exchanged between fiber-accessible customer endpoint 1126 and classical compute resources 1102 without concern for third parties intercepting or altering the communications as they flow through trust free region 1118. Note that, in a similar manner, secure communications may be extended to quantum computing resources 1104 and/or QPUs of quantum hardware providers 1110, 1112, or 1114.

Note that as shown in FIG. 11 a given intermediate node such as intermediate node 1120, 1134, 1108, 116, etc. may be connected to more than two network links. Thus, routing may select respective links to be used for a given intermediate node to form part of a network path from a larger group of network links connected to the respective intermediate node. In this way various different network paths for distributing quantum entanglement may be performed by selecting different combinations of network links from a larger set of network links connected to the respective ones of the intermediate nodes.

In some embodiments any one of the intermediate nodes may introduce a unitary transformation that requires distribution of state information in order for recipients to determine whether measurement results correlate or anti-correlate. Also, in some embodiments, more than one intermediate node may introduce a unitary transformation, in which case state information for each unitary transformation introduced would be needed to determine whether measurement results correlate or anti-correlate.

In some embodiments, the introduction of multiple transformations may be used by multiple independent parties to control quantum entanglement distribution delivery. For example, an operator of a quantum entanglement distribution service may release state information to recipients who have paid to receive the distributed entanglement. However, the quantum entanglement distribution service (or another actor) may condition release of additional state information needed to interpret measurement results on one or more conditions being met, such as a delivery delay period expiring. Thus, for a set of recipients to interpret quantum measurements, the recipients may need both the state information provided by the service provider in response to payment and the additional state information distributed in response to expiration of the delay period.

FIG. 12 illustrates intermediate nodes used in entanglement distribution, wherein the intermediate nodes distribute entangled particle pairs (e.g., pairs of optical photons) via network links to distribute entanglement between a set of endpoints for which entanglement distribution has been requested, according to some embodiments.

In some embodiments, a quantum repeater node, such as quantum repeater nodes 1202 and 1210, may include a quantum memory 1208 configured to store received quantum particles of a set of entangled quantum particles. For example, a quantum memory 1208 may further include components as described in the example quantum memory shown in FIG. 14. Additionally, repeater nodes 1202 and 1210 include entanglement measurement device 1206 configured to perform joint quantum measurements on quantum particles stored in quantum memory 1208, in order to determine a correlation relationship between stored quantum particles of respective pairs of entangled quantum particles (e.g., do the stored particles of the respective pairs of entangled particles have a same or opposite relationship). Additionally, quantum repeaters nodes 1202 and 1210 include a measurement communication interface 1204 configured to provide the results of the joint measurements performed by entanglement measurement device 1206 to respective endpoints, such as customer endpoint 1212 and customer or third-party endpoint 1220 to which the quantum entanglement is being distributed.

For example, in order to distribute quantum entanglement between customer endpoint 1212 and customer (or third-party) endpoint 1220, a routing selection module of a quantum entanglement distribution service may cause entangled particle source node 1214 to distribute respective particles of an entangled particle pair to customer endpoint 1212 and to quantum repeater 1202 via fiber links connecting the entangled particle source node 1214 to the customer endpoint 1212 and connecting the entangle particle source node 1214 the quantum repeater node 1202. Additionally, the routing selection module of the quantum entanglement distribution service may cause entangled particle source node 1218 to distribute respective particles of an entangled particle pair to customer endpoint 1220 and to quantum repeater 1202 via fiber links connecting the entangled particle source node 1218 to the customer endpoint 1220 and connecting the entangle particle source node 1218 to the quantum repeater node 1202. The quantum repeater node 1202 may store the respective quantum particles received from entangled particle source nodes 1214 and 1218 in respective superposition states in quantum memory 1208. Additionally, quantum repeater node 1202 may perform joint measurements on the stored particles using entanglement measurement device 1206 and may provide the results of the joint measurement to the respective endpoints 1212 and 1220 via measurement communication interface 1204. For example, an entanglement measurement result 1224 may be provided to customer endpoint 1212 and an entanglement measurement result 1222 may be provided to customer (or third-party) endpoint 1220. The entanglement measurement results 1222 and 12 may be transmitted via classical communication channels, such as the internet or other suitable communication channels. In some embodiments, the communication of the joint measurements may be performed using a public communication channel without compromising the security or privacy of the distributed quantum entanglement. For example, if a third-party were to intercept the joint measurements, such information could not be used to read or alter information communicated via the distributed quantum entanglement by others not sharing the distributed quantum entanglement. In some embodiments, additional basis measurements may be included with measurements 1222 and 1224, wherein the basis indicates which basis (e.g., horizontal/vertical, or diagonal) is to be used at either endpoint e.g., customer endpoint 1212 and customer or third-party endpoint 1220, wherein both the entanglement measurements (e.g., joint measurements) and the measurement basis (along with the state information distributed as described in FIGS. 1-7) enable quantum data to be communicated between the endpoints, such as communication of symmetric encryption keys, or communication of quantum information via quantum teleportation.

FIG. 13 illustrates another example of intermediate nodes used in entanglement distribution, wherein at least some of the intermediate nodes are connected via satellite links, according to some embodiments.

In some embodiments, a quantum entanglement distribution service may include or use a satellite and optical ground stations to distribute quantum entanglement. For example, in order to distribute quantum entanglement across large distances, a satellite and set of optical ground stations may be used, in some embodiments. FIG. 13 illustrates a similar network as shown in FIG. 12, except entangled particle source node 1218 has been replaced with entangled source node 1306 located in a satellite. Also optical ground station 1302 receives an entangled particle of a pair of entangled particles generated by entangled particle source node 1306 and optical ground station 1304 receives the other particle of the entangled pair. Thus, quantum repeater 1302 and 1310 are connected via entangled particle source node 1306 included in a satellite and via optical ground stations 1302 and 1304. Quantum repeater 1310 may distribute a quantum particle of an entangled pair of quantum particles to customer (or third-party) endpoint 1320 and store the other particle of the entangled pair of particles in quantum memory 1308 of quantum repeater 1310. Additionally, quantum repeater 1310 may store a quantum particle received from entangled source node 1306 via optical ground station 1304 in quantum memory 1308 of quantum repeater 1310. Entanglement measurement device 1306 of quantum repeater 1310 may perform joint measurements on the stored quantum particles of the respective pairs of entangled quantum particles. Additionally, measurement communication interface 1304 of quantum repeater 1310 may provide results (1308 and 1310) of the joint measurement to customer (or third-party) endpoint 1320 and to customer endpoint 1312. In some embodiments, instead of providing results of each joint measurement performed at a respective quantum repeater, the quantum entanglement distribution service may provide an overall result (e.g., same or opposite) to the respective endpoints to which quantum entanglement is being distributed.

FIG. 14 illustrates an example quantum memory that may be included in an intermediate node, according to some embodiments.

In some embodiments, quantum memories as described in FIGS. 12 and 13 may include similar arrangements as quantum memory 1402 illustrated in FIG. 14. Though in some embodiments, other quantum memory configurations may be used. Quantum memory 1402 includes in input interface 1404 that receives particles in a superposition state, superposition particle storage 1406, which may, in some embodiments, include a photonic interface 1408 comprising single quantum bit 1410, and quantum measurement device 1412. For example, single quantum bit 1410 illustrates a silicon vacancy in diamond structure. Though in some embodiments, other structures such as: nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc. may be used.

In some embodiments, quantum memory 1402 may be configured to store a first received entangled particle of a first pair of entangled particles in a first single quantum bit 1410 of photonic interface 1408 of superposition particle storage 1406 and also store a second received entangled particle of a second pair of entangled particles in a second single quantum bit 1410 of photonic interface 1408 of superposition particle storage 1406. The quantum memory 1402 may further be configured to perform one or more joint measurements on the first and second particles via quantum measurement device 1412 without collapsing superposition states of the first and second entangled particles. The joint measurements may determine a correlation relationship between the superposition states of the entangled particles such that entanglement can be extended between the pairs of entangle particles.

The quantum memory 1402 may be heralded, meaning that when a particle arrives and is stored in a single quantum bit 1410, the quantum measurement device 1412 (or other device of the quantum memory 1402) issues a heralding signal announcing the arrival of the particle. In some embodiments, such a heralding signal may be used to operate an optical switch to align the switch such that the quantum memory receives a next particle from an entangled particle source with which quantum entanglement is to be distributed. Furthermore, when the second particle arrives at the quantum memory 1402 from the entangled particle source, a second heralding signal may be issued. The second heralding signal may then cause joint measurements to be performed on the first and second particles stored in the quantum memory 1402. Furthermore, the joint measurements may extend the entanglement. In some embodiments, quantum measurement device 1412 may perform heralding measurements and joint measurements, or in some embodiments, different quantum measurements devices 1412 may be used to perform heralding measurements and joint measurements on received particle pairs. In some embodiments, the heralding function may be performed by a quantum non-destruction measuring device that can detect a particle (e.g., photon) entering the quantum memory 1402 without causing the particle to be collapsed out of the superposition state.

In some embodiments, quantum memory 1402 may further include a conversion interface. For example, in some embodiments, the conversion interface may convert a transmission frequency of a received particle to a different frequency. For example, in some embodiments, fiber optical links may transmit particles using different frequency wavelengths and such variations may be adjusted via a conversion interface of quantum memory 1402. In some embodiments, the conversion interface may be located proximate to the quantum memory device 1402, but may not necessarily be included in the quantum memory device 1402. As another example, particles received at a quantum repeater via optical ground stations, such as optical ground stations 402 and 404 illustrated in FIG. 13, and particles received at the quantum repeater via fiber links may be transmitted at different wavelengths and a conversion interface of the quantum repeater may convert the wavelength of the received particles to a wavelength used by quantum memory device 1412 to store quantum particles.

In some embodiments, quantum memory 1402 (or sets of quantum memories) may store redundant sets of particles for use in generating quantum entanglement that is to be distributed. In such embodiments, the quantum memor(ies) may perform error correction by comparing joint measurement results for multiple sets of particles. Such error correction may function as entanglement purification, in some embodiments. Also, parties at the endpoints connected via the redundantly distributed quantum entanglement may perform error correction.

Figure 15:
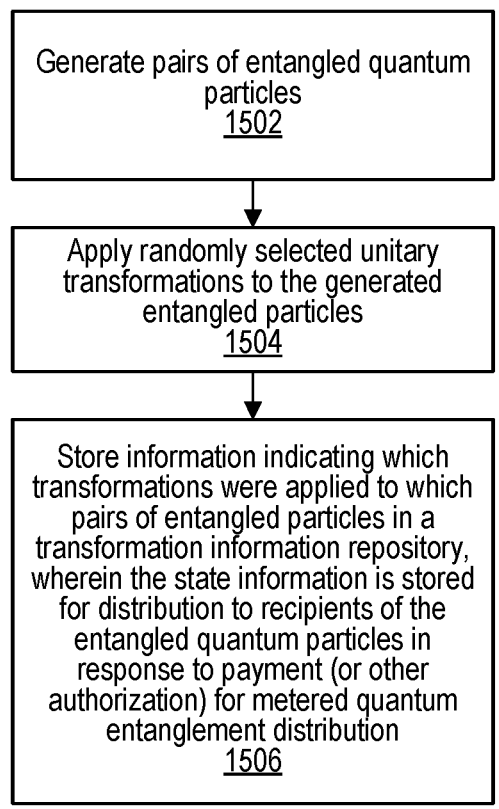
FIG. 15 is a flow chart illustrating an example process performed by an entangled pair source node of a metered quantum entanglement distribution system, according to some embodiments.

FIG. 15 is a flow chart illustrating an example process performed by an entangled pair source node of a metered quantum entanglement distribution system, according to some embodiments.

At block 1502, an entangled pair source node generates pairs of entangled quantum particles, for example using a laser emitting pulses through a non-linear crystal, as an example.

At block 1504, randomly selected unitary transformations are applied to the emitted entangled quantum pairs. For example, the emitted entangled quantum pairs may be randomly transformed to any one of a plurality of different transformed states, such as the Bell states.

At block 1506, information indicating which transformations were applied to which pairs of entangled quantum particles is stored. The stored state information may later be provided to customers to meter out quantum entanglement, for example in response to receiving payment or other authorization for receiving the quantum entanglement. As discussed above, recipients of entangled quantum particles may not be able to determine whether measurement results correlate or anti-correlate without being provided the state information.

Figure 16:
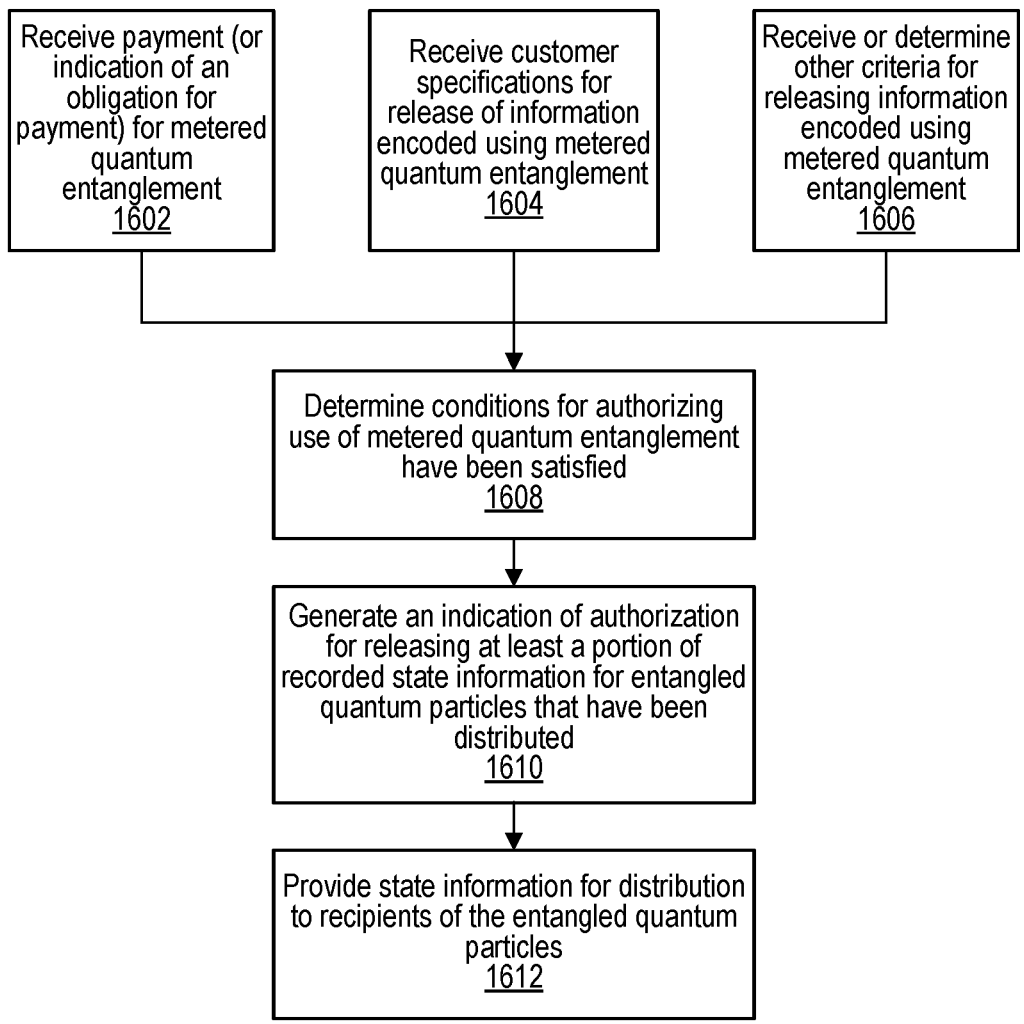
FIG. 16 is a flow chart illustrating an example process performed by one or more computing devices of a metered quantum entanglement distribution system in order to meter out state information for entangled quantum particles distributed by an entangled pair source node, according to some embodiments.

FIG. 16 is a flow chart illustrating an example process performed by one or more computing devices of a metered quantum entanglement distribution system in order to meter out state information for entangled quantum particles distributed by an entangled pair source node, according to some embodiments.

At block 1602, a metered quantum entanglement distribution system receives payment (or indication of an obligation for payment) for metered quantum entanglement. At block 1604, the metered quantum entanglement distribution system additionally or alternatively receives customer specifications for release of information encoded using metered quantum entanglement. As yet another option, at block 1606, the metered quantum entanglement distribution system may receive or determine other criteria for releasing information encoded using metered quantum entanglement.

At block 1608, the metered quantum entanglement distribution system determines whether conditions for authorizing use of metered quantum entanglement have been satisfied. If so, at block 1610, the metered quantum entanglement distribution system generates an indication of authorization for releasing at least a portion of recorded state information for entangled quantum particles that have been distributed. Also, at block 1612, the metered quantum entanglement distribution system provides state information for distribution to recipients of the entangled quantum particles for which authorization has been granted.

Illustrative Computer System

Figure 17:
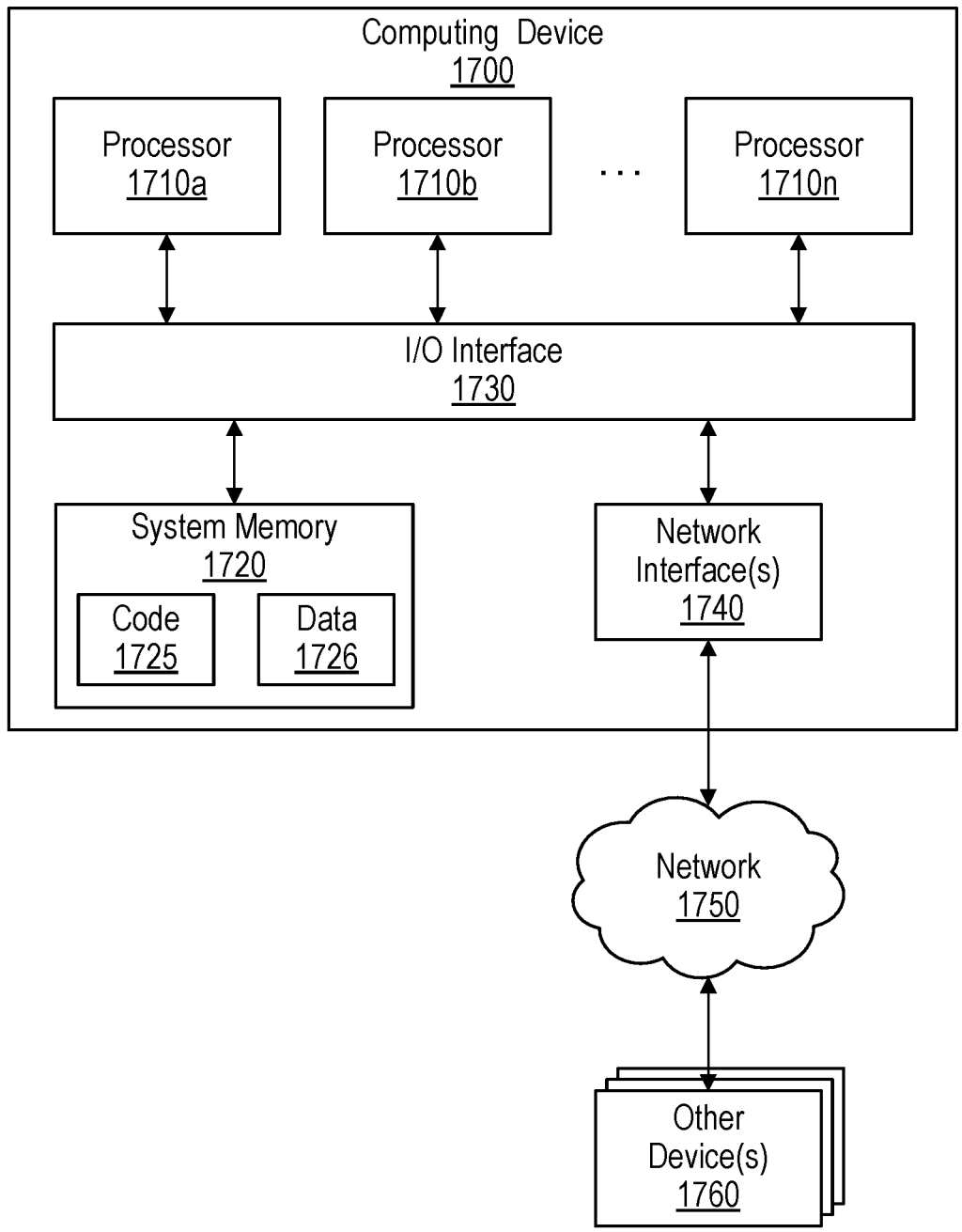
FIG. 17 is a block diagram illustrating an example computing device that may be used in at least some embodiments.

FIG. 17 illustrates such a general-purpose computing device 1700 as may be used in any of the embodiments described herein. In the illustrated embodiment, computing device 1700 includes one or more processors 1710 coupled to a system memory 1720 (which may comprise both non-volatile and volatile memory modules) via an input/ output (I/O) interface 1730. Computing device 1700 further includes a network interface 1740 coupled to I/O interface 1730.

In various embodiments, computing device 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA. In some implementations, graphics processing units (GPUs) may be used instead of, or in addition to, conventional processors.

System memory 1720 may be configured to store instructions and data accessible by processor(s) 1710. In at least some embodiments, the system memory 1720 may comprise both volatile and non-volatile portions; in other embodiments, only volatile memory may be used. In various embodiments, the volatile portion of system memory 1720 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1720 as code 1725 and data 1726.

In some embodiments, I/O interface 1730 may be configured to coordinate I/O traffic between processor 1710, system memory 1720, and any peripheral devices in the device, including network interface 1740 or other peripheral interfaces such as various types of persistent and/or volatile storage devices. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computing device 1700 and other devices 1760 attached to a network or networks 1750, such as other computer systems or devices as illustrated in FIG. 1 through FIG. 16, for example. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks such as Fibre Channel SANs, or via any other suitable type of network and/or protocol.

In some embodiments, system memory 1720 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1700 via I/O interface 1730. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1700 as system memory 1720 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1740. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. An entanglement distribution system, comprising:
   one or more entanglement distribution nodes, comprising:
      an entanglement source configured to emit pairs of entangled particles;
      a transformation element configured to transform respective ones of the emitted pairs such that the respective ones of the emitted pairs are transformed into respective ones of a plurality of Bell states; and
      a transformation information repository configured to store records of resulting Bell states of the pairs of entangled particles distributed from the one or more entanglement distribution nodes; and
   one or more computing devices configured to:
      receive an indication of authorization of a given customer of the entanglement distribution system; and
      in response to receiving the indication of authorization, provide Bell state information indicating, for at least a portion of the pairs of entangled particles distributed from the one or more entanglement distribution nodes, the resulting Bell states of the respective ones of the pairs of entangled particles of the at least a portion,
   wherein the transformation element performs the transformations into the respective ones of the plurality of Bell states in a manner such that customers of the entanglement distribution system require access to Bell state information in order to determine which Bell states were distributed, and
   wherein whether measurements of entangled particles, performed by respective recipients of the entangled particles, correlate or anti-correlate depends on which Bell state the entangled particles were transformed into.

2. The entanglement distribution system of claim 1, wherein the one or more computing devices are further configured to:
   implement a payment interface configured to:
      receive payment for metered distribution of entangled particles; and
      generate the indication of authorization, in response to determining the given customer has submitted payment for the at least a portion of pairs of entangled particles.

3. The entanglement distribution system of claim 1, wherein the entangled particles received by the respective recipients securely distribute a secrete key that can be distributed without trusting the entanglement distribution system to keep the secret key secret.

4. The entanglement distribution system of claim 3, wherein knowledge of the Bell state information by parties other than the respective recipients does not compromise the secrecy of the secret key.

5. The entanglement distribution system of claim 4, wherein the entangled particles are distributed to the respective recipients via a non-trusted environment outside of control of the entanglement distribution system.

6. The entanglement distribution system of claim 1, wherein the plurality of Bell states comprises:
   a first Bell state $|\Phi^+\rangle$, wherein measurement results of the entangled particles correlate in the first Bell state $|\Phi^+\rangle$ when measured in a same first basis, and correlate in the first Bell state $|\Phi^+\rangle$ when measured in a same second basis;
   a second Bell state $|\Phi^-\rangle$, wherein measurement results of the entangled particles correlate in the second Bell state $|\Phi^-\rangle$ when measured in the same first basis, and anti-correlate in the second Bell state $|\Phi^-\rangle$ when measured in the same second basis;
   a third Bell state $|\psi^+\rangle$, wherein measurement results of the entangled particles anti-correlate in the third Bell state $|\psi^+\rangle$ when measured in the same first basis, and correlate in the third Bell state $|\psi^+\rangle$ when measured in the same second basis; and
   a fourth Bell state $|\psi^-\rangle$, wherein measurement results of the entangled particles anti-correlate in the fourth Bell state $|\psi^-\rangle$ when measured in the same first basis, and anti-correlate in the fourth Bell state $|\psi^-\rangle$ when measured in the same second basis.

7. The entanglement distribution system of claim 1, wherein:
   the same first basis is a horizontal/vertical basis; and
   the same second basis is a diagonal basis.

8. The entanglement distribution system of claim 1, wherein:
   the entanglement source is configured to emit the pairs of entangled particles during respective time intervals; and
   the records of the resulting Bell states indicate respective ones of the time intervals during which corresponding ones of the pairs of entangled particles were distributed from the one or more entanglement distribution nodes.

9. The entanglement distribution system of claim 1, wherein:
   the entanglement source is configured to emit the pairs of entangled particles at varying time intervals that form an emission pattern; and
   the records of the resulting Bell states indicate the emission pattern according to which corresponding ones of the pairs of entangled particles were distributed from the one or more entanglement distribution nodes.

10. A method of metering quantum entanglement distribution, the method comprising:
    storing records of resulting states of pairs of entangled particles distributed from an entanglement distribution node, wherein the resulting states comprise a plurality of different states, and wherein the resulting states result from application of a transformation to the pairs of entangled particles prior to distribution of the pairs of entangled particles from the entanglement distribution node; and
    in response to receiving an indication of authorization for receiving at least a portion of the distributed entangled particles,
       providing resulting state information indicating, for the at least a portion of the distributed entangled particles, the resulting states of the respective ones of the pairs of entangled particles.

11. The method of claim 10, wherein the resulting states result from a unitary transformation.

12. The method of claim 11, wherein the unitary transformation is a Bell state transformation.

13. The method of claim 10, further comprising:
    receiving payment, or an obligation to pay, for a metered quantity of entangled particles, wherein the metered quantity corresponds to the at least a portion of the distributed entangled particles,
    wherein the indication of authorization is generated based on receiving the payment or the obligation to pay.

14. The method of claim 10, further comprising:
delaying providing the resulting state information until one or more customer specified conditions are met,
wherein the indication of authorization is generated on based, at least in part, on satisfaction of the one or more customer specified conditions.

15. The method of claim 10, wherein:
the pairs of entangled particles are distributed during respective time intervals; and
the resulting state information indicates respective ones of the time intervals during which corresponding ones of the pairs of entangled particles were distributed.

16. The method of claim 10, wherein:
the pairs of entangled particles are distributed at varying time intervals that form a distribution pattern; and
the resulting state information indicate the distribution pattern.

17. The method of claim 10, wherein said storing the records of the resulting states and said providing the resulting state information are performed by one or more computing devices of a quantum entanglement distribution service, the method further comprising:
coordinating an exchange of measurement basis information between customers of the quantum entanglement distribution service, wherein the customers are recipients of entangled particles of respective pairs of entangled particles.

18. One or more non-transitory, computer-readable, storage media storing program instructions that, when executed on or across one or more processors, cause the one or more processors to:
cause records to be stored of resulting states of pairs of entangled particles distributed from an entanglement distribution node, wherein the resulting states comprise a plurality of different states, and wherein the resulting states result from application of a transformation to the pairs of entangled particles prior to distribution of the pairs of entangled particles from the entanglement distribution node; and
in response to receiving an indication of authorization for receiving at least a portion of the distributed entangled particles, cause resulting state information to be provided, the resulting state information indicating, for the at least a portion of the distributed entangled particles, the resulting states of the respective ones of the pairs of entangled particles.

19. The one or more non-transitory, computer-readable, storage media of claim 18, wherein the program instructions, when executed on or across the one or more processors, further cause the one or more processors to:
determine a payment, or an obligation to pay, for a metered quantity of entangled particles has been received, wherein the metered quantity corresponds to the at least a portion of the distributed entangled particles, and
generate, based on determining the payment or the obligation to pay has been received, the indication of authorization.

20. The one or more non-transitory, computer-readable, storage media of claim 18, wherein the program instructions, when executed on or across the one or more processors, further cause the one or more processors to:
cause the providing of the resulting state information to be delayed until one or more customer specified conditions are met; and
generate the indication of authorization based on determining the one or more customer specified conditions have been met.

* * * * *